(12) United States Patent
Higuchi et al.

(10) Patent No.: US 11,801,715 B2
(45) Date of Patent: Oct. 31, 2023

(54) TIRE

(71) Applicant: Sumitomo Rubber Industries, Ltd., Hyogo (JP)

(72) Inventors: Keiji Higuchi, Kobe (JP); Ryota Ikeda, Kobe (JP); Takashi Hagihara, Kobe (JP); Takuya Osawa, Kobe (JP); Takuya Fujimoto, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 4 days.

(21) Appl. No.: 17/656,117

(22) Filed: Mar. 23, 2022

(65) Prior Publication Data

US 2022/0324261 A1    Oct. 13, 2022

(30) Foreign Application Priority Data

Apr. 13, 2021  (JP) ................................ 2021-067844
Apr. 13, 2021  (JP) ................................ 2021-067846
Dec. 14, 2021  (JP) ................................ 2021-202824

(51) Int. Cl.
*B60C 11/03*         (2006.01)
*B60C 11/13*         (2006.01)
(Continued)

(52) U.S. Cl.
CPC .......... *B60C 11/0304* (2013.01); *B60C 11/01* (2013.01); *B60C 11/125* (2013.01);
(Continued)

(58) Field of Classification Search
CPC . B60C 11/0304; B60C 11/01; B60C 11/1236; B60C 11/125; B60C 11/1307;
(Continued)

(56) References Cited

U.S. PATENT DOCUMENTS

2013/0092304 A1    4/2013  Murata
2015/0258858 A1*   9/2015  Kujime ............... B60C 11/1392
                                                                152/209.8
(Continued)

FOREIGN PATENT DOCUMENTS

JP         06239110 A   *  8/1994
JP      2012-017001 A      1/2012
(Continued)

OTHER PUBLICATIONS

Shinomiya, English Machine Translation of JP H06239110, 1994 (Year: 1994).*

(Continued)

*Primary Examiner* — Justin R Fischer
*Assistant Examiner* — Brendon Charles Darby
(74) *Attorney, Agent, or Firm* — Studebaker & Brackett PC

(57) ABSTRACT

A tire includes a tread portion including four circumferential grooves between outboard and inboard tread edges, and five land portions divided by the circumferential grooves. The circumferential grooves include an inboard shoulder circumferential groove located nearest to the inboard tread edge in the circumferential grooves. The land portions include an inboard shoulder land portion disposed axially outward of the inboard shoulder circumferential groove and having a ground contact surface with the smallest axial width in the land portions. The inboard shoulder land portion is provided with inboard shoulder lateral grooves and inboard shoulder sipes. The inboard shoulder lateral grooves include inner ends away from the inboard shoulder circumferential groove. The inboard shoulder lateral grooves extend axially outward from the inner ends to a location beyond the inboard tread edge. The inboard shoulder sipes extends from the inboard shoulder circumferential groove to a location beyond the inboard tread edge.

18 Claims, 19 Drawing Sheets

(51) Int. Cl.
*B60C 11/12* (2006.01)
*B60C 11/01* (2006.01)

(52) U.S. Cl.
CPC ...... *B60C 11/1236* (2013.01); *B60C 11/1307* (2013.01); *B60C 11/1353* (2013.01); *B60C 2011/0341* (2013.01); *B60C 2011/0374* (2013.01)

(58) Field of Classification Search
CPC ......... B60C 11/1353; B60C 2011/0341; B60C 2011/0374; B60C 11/1384; B60C 11/1392; B60C 11/0332; B60C 1/033
See application file for complete search history.

(56) References Cited

U.S. PATENT DOCUMENTS

| 2017/0253086 | A1* | 9/2017 | Sanae | B60C 11/0304 |
| 2018/0009269 | A1* | 1/2018 | Kawagoe | B60C 11/1236 |
| 2018/0079261 | A1* | 3/2018 | Kujime | B60C 11/0304 |
| 2018/0141389 | A1* | 5/2018 | Yamaoka | B60C 11/1263 |
| 2018/0170114 | A1* | 6/2018 | Hayashi | B60C 11/12 |
| 2019/0061432 | A1* | 2/2019 | Ikeda | B60C 11/1204 |
| 2019/0152268 | A1* | 5/2019 | Kanamura | B60C 11/0008 |

FOREIGN PATENT DOCUMENTS

| JP | 2012111438 A | * | 6/2012 |
| JP | 3 213 931 A1 | | 9/2017 |
| JP | 3 822 093 A1 | | 5/2021 |

OTHER PUBLICATIONS

Tanaka, English Machine Translation of JP 2012111438, 2012 (Year: 2012).*

The extended European search report issued by the European Patent Office dated Sep. 13, 2022, which corresponds to European Patent Application No. 22162870.4-1012 and is related to U.S. Appl. No. 17/656,117.

* cited by examiner

TIRE

RELATED APPLICATIONS

This application claims the benefit of foreign priorities to Japanese Patent Applications No. JP-P2021-067844, filed Apr. 13, 2021, No. JP-P2021-067846, filed Apr. 13, 2021, and No. JP-P2021-202824, filed Dec. 14, 2021, which are incorporated by reference in its entirety.

FIELD OF THE INVENTION

The present disclosure relates to a tire.

BACKGROUND OF THE INVENTION

Conventionally, various tires in which the tread portion is composed of five land portions in the tire axial direction (hereinafter, may be referred to as "five-rib tire") have been proposed. The following Patent Document 1 discloses a pneumatic tire configured as a five-rib tire. The tire includes a crown rib, a pair of middle ribs and a pair of shoulder ribs, and respective groove volume ratios thereof are limited to have a certain relationship. The tires are expected to increase cornering power and improve steering stability.

PATENT DOCUMENT

[Patent document 1] Japanese Unexamined Patent Application Publication 2012-017001

SUMMARY OF THE INVENTION

In recent years, tires are required achieving both reduction of noise outside the vehicle and improvement of braking performance, and this tendency is particularly remarkable in Europe. In order to reduce noise outside the vehicle and improve braking performance, it may be considered effective to reduce the volume of grooves in the tread portion. However, such a method is accompanied by deterioration of wet performance.

The present disclosure has been made in view of the above circumstances and has a major object to provide a tire having a five-rib structure capable of improving noise performance and braking performance while ensuring wet performance.

In one aspect of the present disclosure, a tire includes a tread portion having a designated mounting direction to a vehicle, the tread portion including an outboard tread edge and an inboard tread edge which are respectively located outside and inside of a vehicle when being mounted to the vehicle, four circumferential grooves extending continuously in a tire circumferential direction between the outboard tread edge and the inboard tread edge, and five land portions divided by the four circumferential grooves. The four circumferential grooves include an inboard shoulder circumferential groove located nearest to the inboard tread edge in the four circumferential grooves. The five land portions include an inboard shoulder land portion disposed outward in the tire axial direction of the inboard shoulder circumferential groove, the inboard shoulder land portion having a ground contact surface with a smallest width in the tire axial direction in the five land portions. The inboard shoulder land portion is provided with a plurality of inboard shoulder lateral grooves and a plurality of inboard shoulder sipes. The plurality of inboard shoulder lateral grooves includes inner ends that are located by a distance in the tire axial direction away from the inboard shoulder circumferential groove. The plurality of inboard shoulder lateral grooves extends outward in the tire axial direction from the inner ends to a location beyond the inboard tread edge. The plurality of inboard shoulder sipes extends from the inboard shoulder circumferential groove to a location beyond the inboard tread edge.

DETAILED DESCRIPTION OF THE INVENTION

Figure 1:
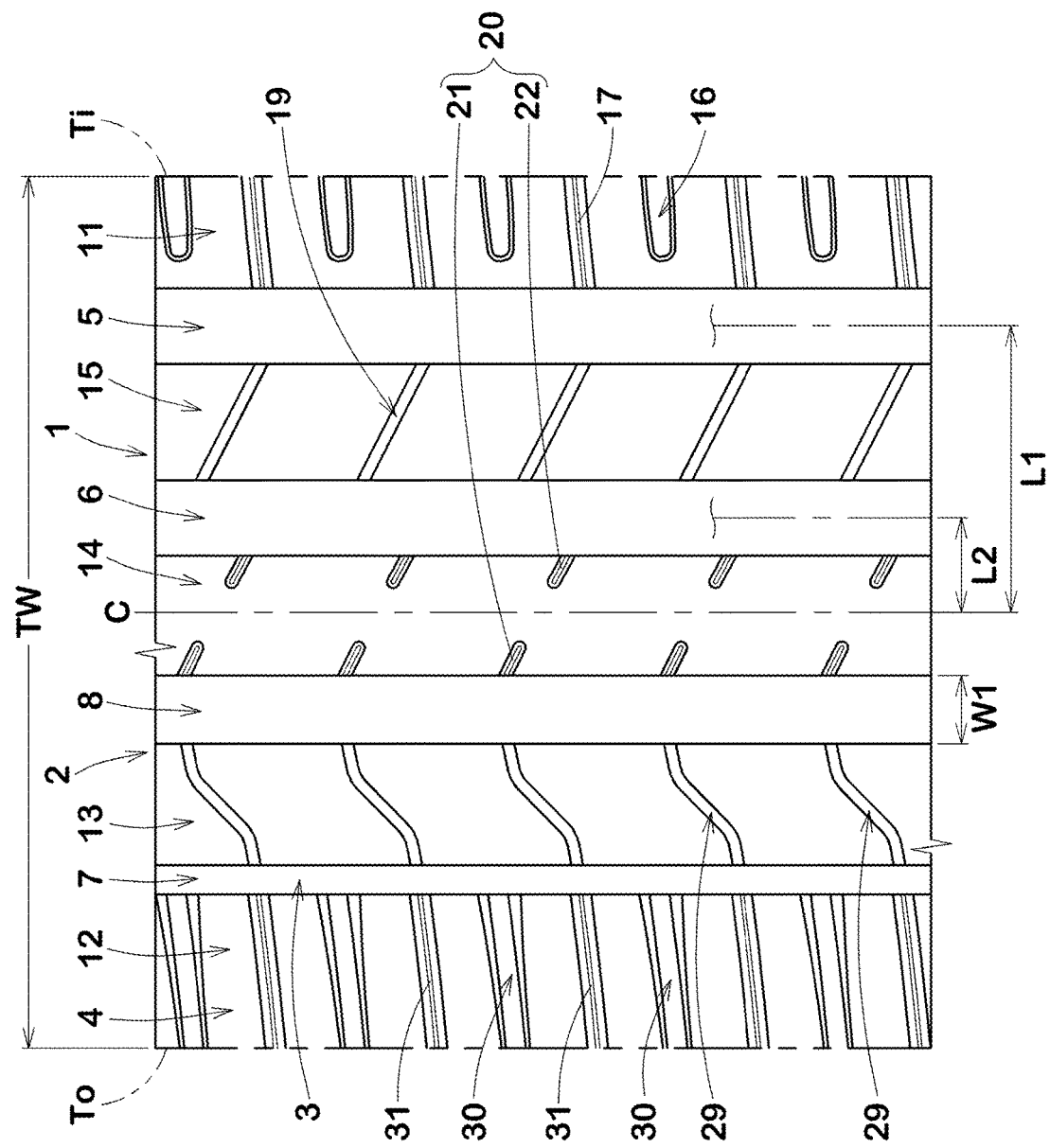
FIG. 1 is a development view of a tread portion in accordance with an embodiment of the present disclosure.

Hereinafter, one or more embodiments of the present disclosure will be described with reference to the drawings. FIG. 1 is a development view of a tread portion 2 of a tire 1 in accordance with an embodiment of the present disclosure. The tire 1 according to the present embodiment is preferably embodied as a pneumatic tire for passenger car. However, the present disclosure is not limited to such an aspect. The present disclosure may be applied to a heavyduty tire and a non-pneumatic tire in which the inside of the tire is not filled with pressurized air.

As illustrated in FIG. 1, the tire 1 according to the present disclosure includes the tread portion 2 having a designated mounting direction to a vehicle. The tread portion 2 includes an outboard tread edge To and an inboard tread edge Ti which are respectively located outside and inside of a vehicle when the tire 1 is mounted to the vehicle. The mounting direction to a vehicle is indicated by letters or symbols on sidewall portions (not illustrated), for example.

The outboard tread edge To and the inboard tread edge Ti are the axial outermost edges of the ground contacting patch of the tire 1 which occurs under the condition such that the tire 1 under a normal state is grounded on a plane with a standard tire load at zero camber angles.

As used herein, when a tire is a pneumatic tire based on a standard, the "normal state" is such that the tire 1 is mounted onto a standard wheel rim with a standard pressure but loaded with no tire load. If a tire is not based on the standards, or if a tire is a non-pneumatic tire, the normal state is a standard state of use according to the purpose of use of the tire and means a state of no load. As used herein, unless otherwise noted, dimensions of portions of the tire are values measured under the normal state.

As used herein, the "standard wheel rim" is a wheel rim officially approved for each tire by standards organizations on which the tire is based, wherein the standard wheel rim is the "standard rim" specified in JATMA, the "Design Rim" in TRA, and the "Measuring Rim" in ETRTO, for example.

As used herein, the "standard pressure" is a standard pressure officially approved for each tire by standards organizations on which the tire is based, wherein the standard pressure is the "maximum air pressure" in JATMA, the maximum pressure given in the "Tire Load Limits at Various Cold Inflation Pressures" table in TRA, and the "Inflation Pressure" in ETRTO, for example.

As used herein, when a tire is a pneumatic tire based on a standard, the "standard tire load" is a tire load officially approved for each tire by the standards organization in which the tire is based, wherein the standard tire load is the "maximum load capacity" in JATMA, the maximum value given in the above-mentioned table in TRA, and the "Load Capacity" in ETRTO, for example. If a tire is not based on the standards, or it a tire is a non-pneumatic tire, the "standard tire load" refers to the load acting on the tire when the tire is under a standard mounted condition. The "standard mounted condition" is such that the tire is mounted to a standard vehicle according to the purpose of use of the tire, and the vehicle is stationary on a flat road surface while being able to run.

The tread portion 2 further includes four circumferential grooves 3 extending continuously in the tire circumferential direction between the outboard tread edge To and the inboard tread edge Ti, and five land portions 4 divided by the four circumferential grooves 3.

The circumferential grooves 3 include an inboard shoulder circumferential groove 5 that is located nearest to the inboard tread edge Ti in the four circumferential grooves 3. Further, the circumferential grooves 3 include an inboard crown circumferential groove 6, an outboard shoulder circumferential groove 7 and an outboard crown circumferential groove 8. The inboard crown circumferential groove 6 is disposed between the tire equator C and the inboard shoulder circumferential groove 5. The outboard shoulder circumferential groove 7 is located nearest to the outboard tread edge To in the four circumferential grooves 3. The outboard crown circumferential groove 8 is disposed between the outboard shoulder circumferential groove 7 and the tire equator C.

A distance L1 in the tire axial direction from the tire equator C to a groove centerline of the outboard shoulder circumferential groove 7 or a groove centerline of the inboard shoulder circumferential groove 5, for example, is in a range from 25% to 35% of the tread width TW. A distance L2 in the tire axial direction from the tire equator C to a groove centerline of the outboard crown circumferential groove 8 or a groove centerline of the inboard crown circumferential groove 6, for example, is in a range from 5% to 15% of the tread width TW. Note that the tread width TW is a distance in the tire axial direction from the outboard tread edge (To) to the inboard tread edge Ti under the normal state.

In the present embodiment, the circumferential grooves 3, for example, extend straight parallel to the tire circumferential direction. The circumferential grooves 3, for example, may extend in a wavy manner.

In the present embodiment, the circumferential grooves 3 have groove widths W1 equal to or more than 3.0 mm. The groove widths W1 of the circumferential grooves 3, for example, are in a range from 2.0% to 8.0% of the tread width TW. In the present embodiment, the outboard shoulder circumferential groove 7 has the smallest groove width in the four circumferential grooves 3. However, the present disclosure is not limited to such an aspect. A depth of the circumferential grooves 3, for example, is in a range from 5 to 10 mm for a pneumatic tire for passenger car.

The five land portions 4 includes an inboard shoulder land portion 11 disposed outward in the tire axial direction of the inboard shoulder circumferential groove 5. Further, the five land portions 4 includes an outboard shoulder land portion 12, an outboard middle land portion 13, a crown land portion 14 and an inboard middle land portion 15. The outboard shoulder land portion 12 is disposed outward in the tire axial direction of the outboard shoulder circumferential groove 7. The outboard middle land portion 13 is sectioned between the outboard shoulder circumferential groove 7 and the outboard crown circumferential groove 8. The crown land portion 14 is sectioned between the outboard crown circumferential groove 8 and the inboard crown circumferential groove 6. The inboard middle land portion 15 is sectioned between the inboard shoulder circumferential groove 5 and the inboard crown circumferential groove 6.

Figure 2:
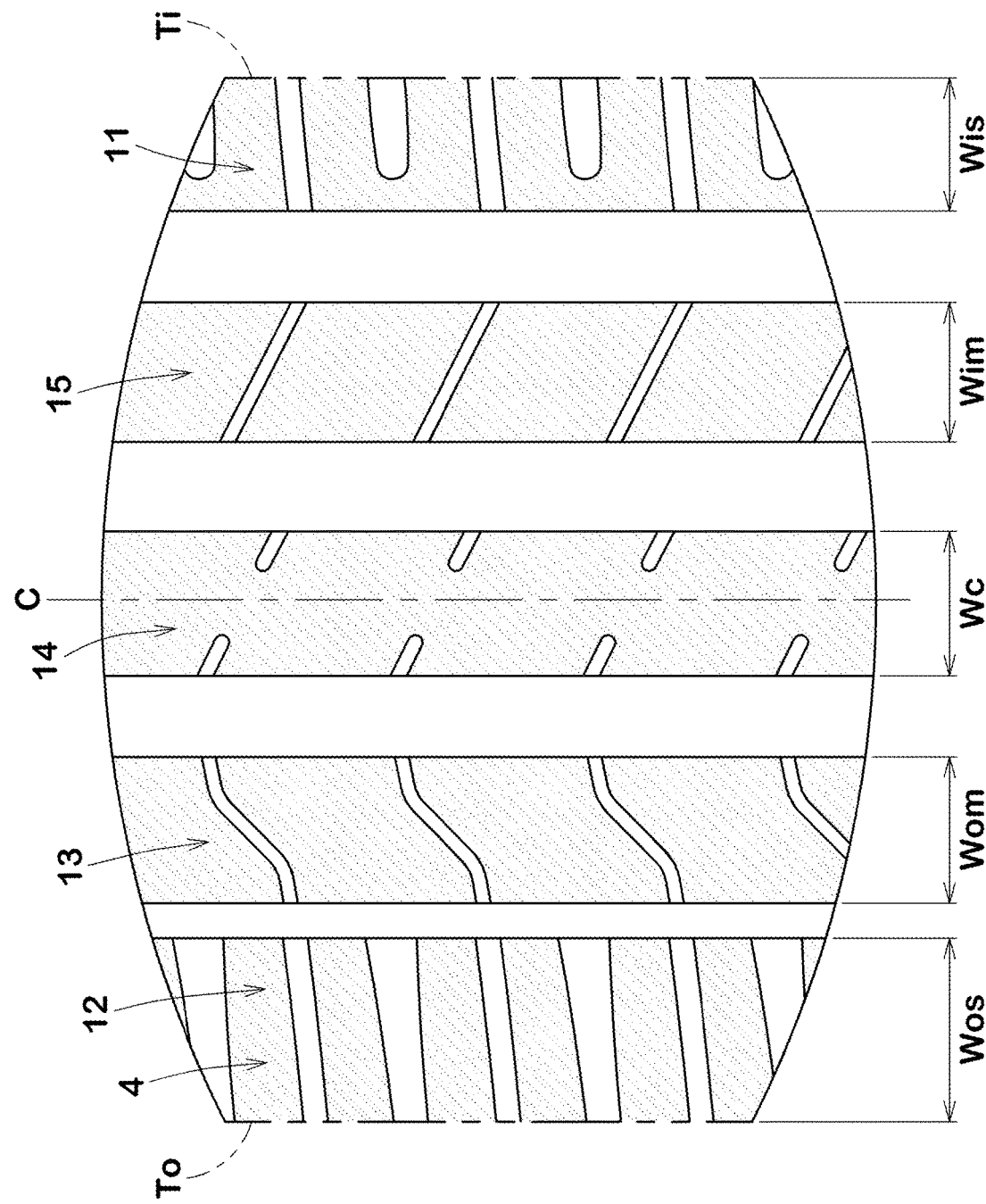
FIG. 2 is an enlarged view of a ground contact patch when the tread portion is in contact with the ground.

FIG. 2 illustrates an enlarged view of a ground contact patch when the tread portion 2 is in contact with the ground. This contact patch is a contact patch in a 50% loaded state in which a 50% of the standard tire load is applied to the tire 1 in the normal state and the tire 1 is in contact with a flat surface at zero camber angles. As illustrated in FIG. 2, in the present disclosure, the inboard shoulder land portion 11 has a ground contact surface whose width in the tire axial direction is the smallest in the five land portions 4.

Figure 3:
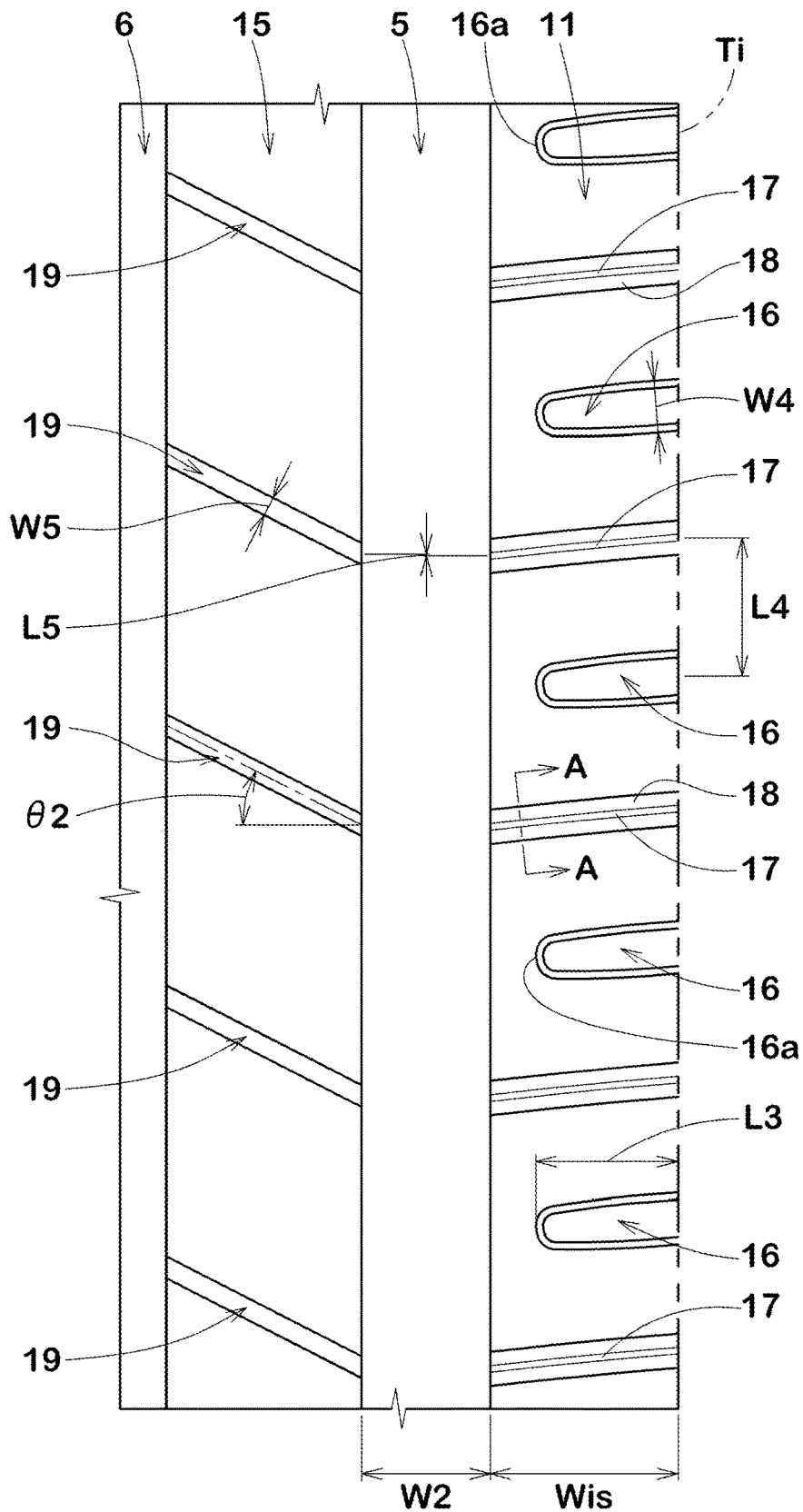
FIG. 3 is an enlarged view of an inboard shoulder land portion and an inboard middle land portion of FIG. 1.

FIG. 3 illustrates an enlarged view of the inboard shoulder land portion 11 and the inboard middle land portion 15. As illustrated in FIG. 3, the inboard shoulder land portion 11 is provided with a plurality of inboard shoulder lateral grooves 16 and a plurality of inboard shoulder sipes 17.

The inboard shoulder lateral grooves 16 includes inner ends 16a that are located by a distance in the tire axial direction away from the inboard shoulder circumferential groove 5. The inboard shoulder lateral grooves 16 extend outward in the tire axial direction from the inner ends 16a to a location beyond the inboard tread edge Ti. Further, the inboard shoulder sipes 17 extend from the inboard shoulder circumferential groove 5 to a location beyond the inboard tread edge Ti.

Figure 4:
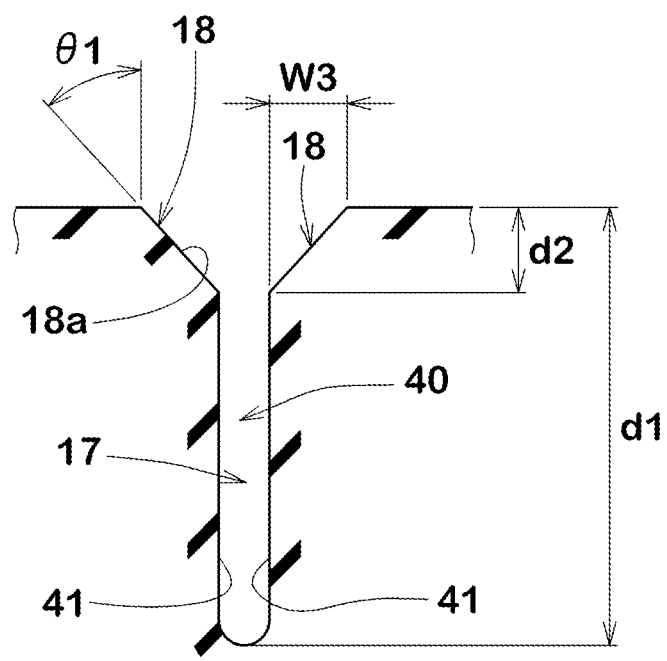
FIG. 4 is a cross-sectional view taken along the line A-A of FIG. 3.

FIG. 4 is a cross-sectional view taken along the line A-A of FIG. 3. FIG. 4 shows a cross section of one of the inboard shoulder sipes 17 as an example of a cross section of the sipes. As used herein, "sipe" is an incision having a small width. The sipe has a main portion 40 including two wall surfaces 41 facing substantially parallel, in which the width between the two wall surfaces 41 is equal to or less than 1.5 mm. A width of sipe is preferably in a range from 0.5 to 1.5 mm. The sipe may extend from an opening on the tread portion 2 to the bottom with a constant width. Alternatively, the sipe may have a pair of sipe edges each or both having a chamfer portion 18. The chamfer portion 18 is configured as an inclined surface 18a connected to the outer surface of the tread portion 2 with the adjacent wall surface 41. The opening width of the sipe when one or more chamfer portions 18 are formed may exceed 1.5 mm. In addition, the bottom of the sipe may be connected to a flask-bottom having a width greater than 1.5 mm.

By adopting the above features, the tire according to the present disclosure can improve noise performance and braking performance while ensuring wet performance. The following mechanism is inferred as the reason.

As illustrated in FIG. 2 and FIG. 3, in the present disclosure, since the inboard shoulder land portion 11 has the smallest width of the ground contact surface, the inboard shoulder land portion 11 can easily cut the water film on wet road surface during wet driving, and thus wet performance can be ensured. Further, such an inboard shoulder land portion 11 can be expected to reduce the impact noise when coming into contact with the ground. Furthermore, since the inboard shoulder lateral grooves 16 are not in communication with the inboard shoulder circumferential groove 5, air pumping noise tends to be small, and further improvement in noise performance can be expected.

The inventors of the present disclosure have found that the inboard shoulder land portion 11 having a small width of the ground contact surface and provided with the inboard shoulder lateral grooves 16 which do not communicate with the inboard shoulder lateral grooves 5 tends to easily be deformed when coming into contact with the ground, and that the ground contact pressure tends to be uneven and braking performance tends to be impaired.

In order to deal with the above problems, the inboard shoulder sipes 17 is provided in the inboard shoulder land portion 11 in the present disclosure. As a result, the distortion of the ground contact surface can be reduced, and the ground contact pressure can be uniform. Thus, excellent braking performance can be obtained. It is presumed that the tires according to the present disclosure can improve noise performance and braking performance while ensuring wet performance by the above mechanism.

As illustrated in FIG. 4, in some more preferred embodiments, the inboard shoulder sipes 17 each have a pair of sipe edges each having a chamfer portion 18. This feature can reduce the above-mentioned distortion of the ground contact surface further, providing further excellent performance. Note that the present disclosure is not limited to such an aspect. The inboard shoulder sipes 17, for example, each may have a pair of sipe edges where the ground contact surface and the sipe walls extending in the tire radial direction intersect at a substantially right angle (i.e., no chamfer portion).

Hereinafter, a more detailed configuration of the present embodiment will be described. Note that each configuration described below shows a specific aspect of the present embodiment. Thus, the present disclosure can exert the above-mentioned effects even if the tire does not include the configuration described below. Further, if any one of the configurations described below is applied independently to the tire of the present disclosure having the above-mentioned characteristics, the performance improvement according to each additional configuration can be expected. Furthermore, when some of the configurations described below are applied in combination, it is expected that the performance of the additional configurations will be improved.

As illustrated in FIG. 2, the five land portions 4 of the tread portion are formed such that the nearer to the outboard tread edge To the larger a width in the tire axial direction of the ground contact surface thereof. Thus, in the five land portions 4 of the tire 1, the nearer to the outboard tread edge To, the greater the rigidity. Hence, when the center of the ground contact surface is moved toward the outboard tread edge To side by steering, the steering response can be stable and cornering force can be generated linearly with the increase in steering angle. This can provide excellent steering stability and ride comfort.

Specifically, the width Wis in the tire axial direction of the ground contact surface of the inboard shoulder land portion 11 is preferably equal to or more than 90% of the width Wc in the tire axial direction of the ground contact surface of the crown land portion 14, more preferably in a range of from 90% to 99%. Similarly, the width Wim in the tire axial direction of the ground contact surface of the inboard middle land portion 15 is preferably in a range of from 90% to 99% of the width Wc of the crown land portion 14.

The width Wom in the tire axial direction of the outboard middle land portion 13 is preferably in a range of from 101% to 107% of the width Wc of the crown land portion 14. The width Wos in the tire axial direction of the outboard shoulder land portion 12 is preferably in a range of from 114% to 124% of the width Wc of the crown land portion 14. When the tire 1 according to the present embodiment is mounted on all wheels of the vehicle, the front wheels and the rear wheels can exhibit a well-balanced cornering force, and excellent initial response and steering stability can be exhibited.

As illustrated in FIG. 3, the maximum groove width W2 of the inboard shoulder circumferential groove 5 is preferably in a range of from 55% to 70% of the width Wis in the tire axial direction of the ground contact surface of the inboard shoulder land portion 11. Such an inboard shoulder circumferential groove 5 can improve wet performance and noise performance in a well-balanced manner.

The inboard shoulder lateral grooves 16, for example, extend at an angle equal to or less than 10 degrees with respect to the tire axial direction. Further, the inboard shoulder lateral grooves 16, for example, cross the center location in the tire axial direction of the ground contact surface of the inboard shoulder land portion 11. In the present embodiment, a region between the inner ends 16a of the inboard shoulder lateral grooves 16 and the inboard shoulder circumferential groove 5 is not provided with any other sipes nor grooves. A length L3 in the tire axial direction of the inboard shoulder lateral grooves 16, for example, is in a range of from 70% to 85% of the width Wis of the ground contact surface of the inboard shoulder land portion 11.

The inboard shoulder sipes 17, for example, extend along the inboard shoulder lateral grooves 16. The angle difference between the inboard shoulder sipes 17 and the inboard shoulder lateral grooves 16 is equal to or less than 5 degrees. In the present embodiment, the inboard shoulder sipes 17 and the inboard shoulder lateral grooves 16 extend in parallel with each other.

As illustrated in FIG. 4, a depth d1 of the inboard shoulder sipes 17, for example, is in a range of from 3.0 to 5.0 mm. Each chamfer portion 18 of the inboard shoulder sipe 17, for example, includes an inclined surface 18a which is inclined at an angle θ1 in a range of from 30 to 60 degrees with respect to a sipe-depth direction. A depth d2 of each chamfer portion 18, for example, is in a range of from 0.5 to 2.0 mm. In a tread plan view, a width W3 of each chamfer portion 18, for example, is in a range of from 2.0 to 4.0 mm. Such a chamfer portion 18 can improve braking performance for sure.

As illustrated in FIG. 3, the inboard middle land portion 15 is provided with a plurality of inboard middle lateral grooves 19. The inboard middle lateral grooves 19 traverse the inboard middle land portion 15 completely in the tire axial direction. The inboard middle lateral grooves 19 can help to improve wet performance. Note that the present disclosure is not limited to such an aspect. As will be described later, the inboard middle land portion 15 may be provided with only sipes.

The inboard middle lateral grooves 19, for example, extend straight with a constant groove width W5. The groove width W5 of the inboard middle lateral grooves 19 is smaller than the maximum groove width W4 of the inboard shoulder lateral grooves 16 on the ground contact surface of the inboard shoulder land portion 11. Preferably, the groove width W5 is in a range of from 30% to 50% of the groove width W4.

The inboard middle lateral grooves 19, for example, are inclined at an angle with respect to the tire axial direction. In each figure of the present specification, the inboard middle lateral grooves 19 are inclined downward to the right. Hereinafter, the direction of such an inclination may be referred to as "the first direction with respect to the tire axial direction". An angle θ2 with respect to the tire axial direction of the inboard middle lateral grooves 19 is greater than the angle with respect to the tire axial direction of the inboard shoulder lateral grooves 16, and is preferably in a range of from 15 to 45 degrees, for example. The inboard middle lateral grooves 19 can offer friction force in the tire axial direction when driving on wet roads.

A pitch length in the tire circumferential direction of the plurality of inboard middle lateral grooves 19, for example, is in a range of from 80% to 120% of a pitch length in the tire circumferential direction of the plurality of inboard shoulder sipes 17, and in some preferred embodiment the pitch lengths are the same as with each other.

Distances L5 in the tire circumferential direction between ends (the ends of the groove centerlines of the inboard middle lateral grooves 19) of the respective inboard middle lateral grooves 19 on the inboard shoulder circumferential groove 5 side and ends (the ends of the sipe centerlines of the inboard shoulder sipes 17) of the respective inboard shoulder sipes 17 on the inboard shoulder circumferential groove 5 side are equal to or less than 15% of a distance L4 in the tire circumferential direction at the inboard tread edge Ti from one of inboard shoulder lateral grooves 16 to one of the inboard shoulder sipes 17 which are directly adjacent in the tire circumferential direction. Note that the distance L4 means a distance between the groove centerline of the inboard shoulder lateral groove 16 and the sipe centerline of the inboard shoulder sipe 17 at the inboard tread edge Ti. This feature can prevent pitch noise of the inboard middle lateral grooves 19 and the inboard shoulder lateral grooves 16 from overlapping each other. In addition, the ground contact pressure can be made uniform between the inboard shoulder land portion 11 and the inboard middle land portion 15.

In the present embodiment, the inboard middle land portion 15 and the inboard shoulder land portion 11 are provided with only the above-mentioned grooves and sipes, and no grooves or sipes other than these are provided. This can ensure that the above effects are exhibited.

Figure 5:
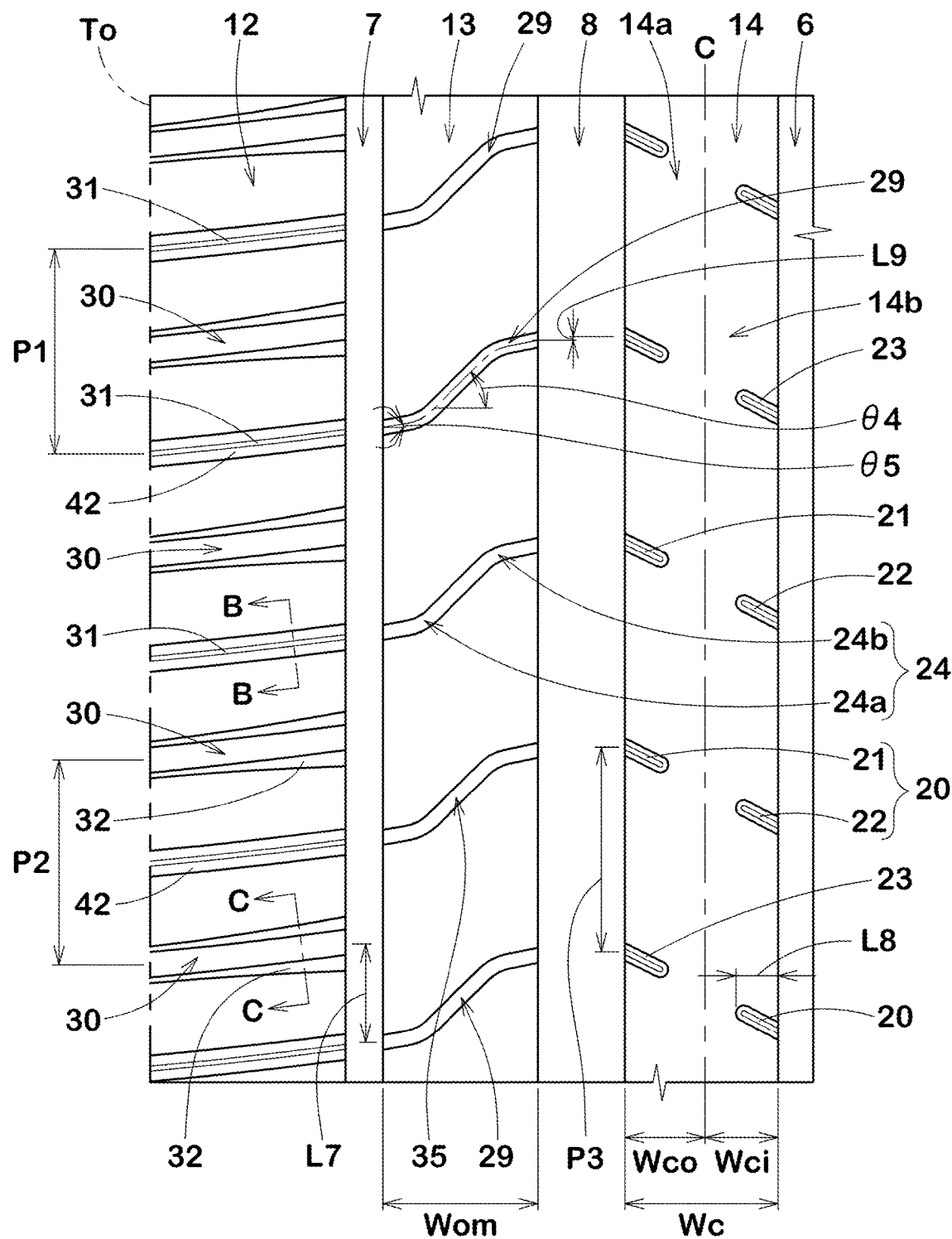
FIG. 5 is an enlarged view of a crown land portion, an outboard middle land portion and an outboard shoulder land portion of FIG. 1.

FIG. 5 illustrates an enlarged view of the outboard shoulder land portion 12, the outboard middle land portion 13 and the crown land portion 14. As illustrated in FIG. 5, the outboard shoulder land portion 12 is provided with a plurality of outboard shoulder lateral grooves 30 and a plurality of outboard shoulder sipes 31. The outboard shoulder lateral grooves 30 extend from the outboard shoulder circumferential groove 7 to a location beyond the outboard tread edge To. The outboard shoulder sipes 31 are in communication with the outboard shoulder circumferential groove 7. In the present embodiment, the outboard shoulder sipes 31 extend from the outboard shoulder circumferential groove 7 to a location beyond the outboard tread edge To.

Figure 6:
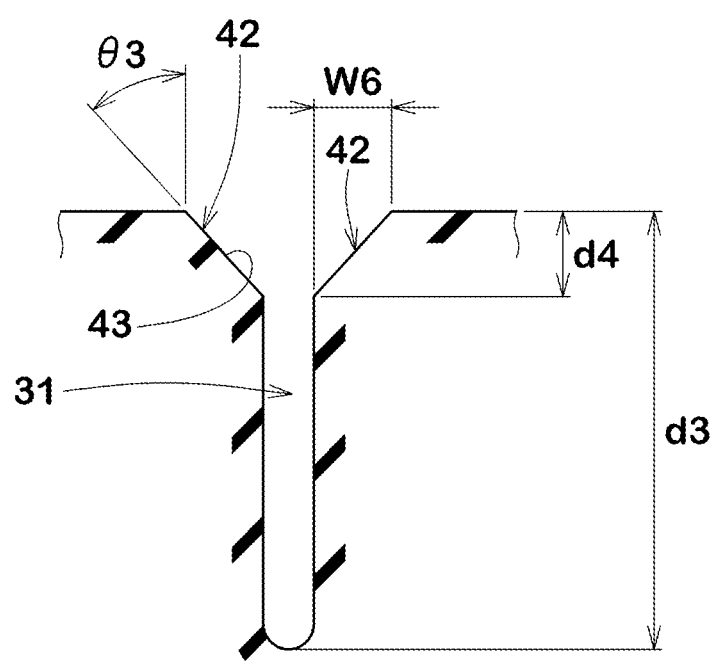
FIG. 6 is a cross-sectional view taken along the line B-B of FIG. 5.

FIG. 6 illustrates a cross-sectional view taken along the line B-B of FIG. 5. As illustrated in FIG. 5 and FIG. 6, the outboard shoulder sipes each include a pair of sipe edges each having a chamfer portion 42, and the chamfer portion 42 extends over an entire region of each sipe edge, in a region from at least the outboard shoulder circumferential groove 7 to the outboard tread edge To.

As illustrated in FIG. 5, the outboard middle land portion 13 is provided with a plurality of outboard middle groove-like portions 29 that traverse the outboard middle land portion 13 completely in the tire axial direction. As used herein, the "groove-like portion" means a void that includes the above-mentioned sipes as well as grooves having a width greater than that of the sipes. In the present embodiment, the outboard middle groove-like portions 29 each include a pair of wall surfaces extending along the tire radial direction and a maximum distance between the pair of wall surfaces is greater than 1.5 mm, thereby being configured as outboard middle lateral grooves 24. Note that the present disclosure is not limited to such an aspect. As will be desorbed later, the outboard middle groove-like portions 29 may be configured as outboard middle sipes each having a pair of wall surfaces whose maximum distance therebetween is equal to or less than 1.5 mm. The pair of wall surfaces, for example, has an angle equal to or less than 10 degrees with respect to the tire radial direction, which can be distinguished from inclined surfaces of the chamfer portions. Further, an angle between the pair of wall surfaces, for example, is equal to or less than 15 degrees.

Figure 7:
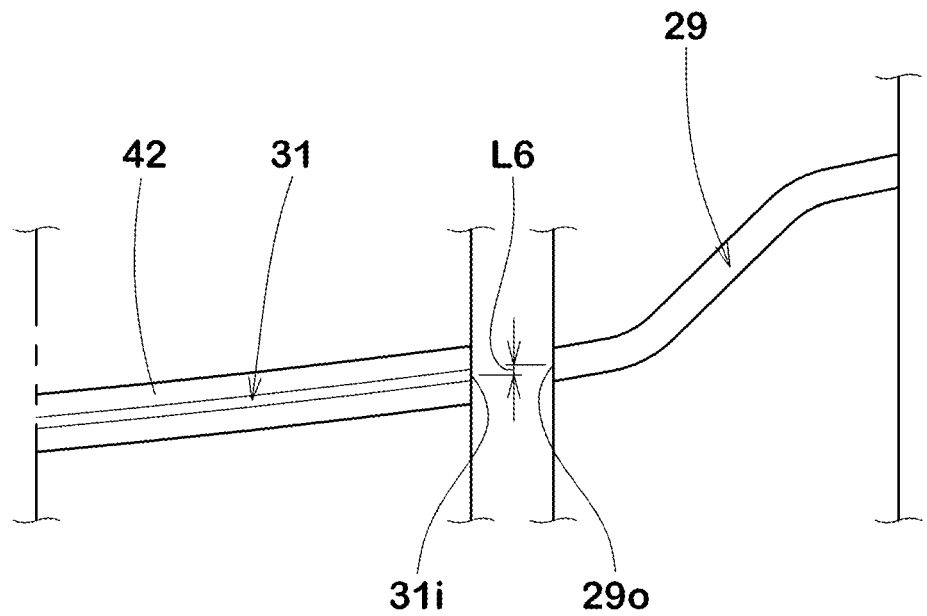
FIG. 7 is an enlarged view of an outboard shoulder sipe and an outboard middle lateral groove.

FIG. 7 is an enlarged view of one of the outboard shoulder sipes 31 and one of the outboard middle groove-like portions 29. As illustrated in FIG. 7, distances L6 in the tire circumferential direction between inner ends 31i of the respective outboard shoulder sipes 31 on the outboard shoulder circumferential groove 7 side and outer ends 29o of the outboard middle groove-like portions 29 on the respective outboard shoulder circumferential groove 7 side are equal to or less than 5% of a pitch length P1 (shown in FIG. 5) in the tire circumferential direction of the plurality of outboard shoulder sipes 31. By adopting the above features, the tire according to the present disclosure can improve steering stability and braking performance while ensuring wet performance. The following mechanism can be inferred as the reason.

As illustrated in FIG. 5, in the tire 1 according to the present embodiment, the outboard shoulder lateral grooves 30 and the outboard middle groove-like portions 29 can exhibit sufficient drainage performance and can ensure wet performance. Further, the outboard shoulder sipes 31 having the sipe edges with the chamfer portions 42 can suppresses the outboard shoulder land portion 12 from distortion when cornering or braking where the ground pressure acting on the outboard shoulder land portion 12 increases, and thus steering stability and braking performance can be improved.

In the present embodiment, since the distances L6 are set small like equal to or less than 5% of the pitch length P1, the chamfer portions 42 come into contact with the ground easily when the outboard shoulder sipes 31 and the outboard middle groove-like portions 29 come into contact with the ground. Further, due to the above-mentioned features, since the outboard shoulder lateral grooves 30 and the outboard middle groove-like portions 29 are displaced in the tire circumferential direction, the blocks in the outboard shoulder land portion 12 and the outboard middle land portion 13 can exhibit frictional force continuously. In the present embodiment, it is presumed that the above mechanism can improve steering stability and braking performance while ensuring wet performance.

As illustrated in FIG. 5, in the present embodiment, the outboard shoulder lateral grooves 30 and the outboard shoulder sipes 31 are arranged alternately in the tire circumferential direction. Thus, the pitch length P2 in the tire circumferential direction of the outboard shoulder lateral grooves 30 is the same as the pitch length P1 in the tire circumferential direction of the outboard shoulder sipes 31.

The outboard shoulder lateral grooves 30 and the outboard shoulder sipes 31, for example, are inclined at an angle equal to or less than 10 degrees with respect to the tire axial direction, and preferably extend in parallel with each other. Such outboard shoulder lateral grooves 30 and the outboard shoulder sipes 31 can help to improve braking performance.

A groove width of the outboard shoulder lateral grooves 30, for example, decreases continuously toward the outboard tread edge To. Thus, the blocks divided by the outboard shoulder lateral grooves 30 each have a relatively longer length in the tire circumferential direction on the outboard tread edge To side, which can improve steering stability.

Figure 8:
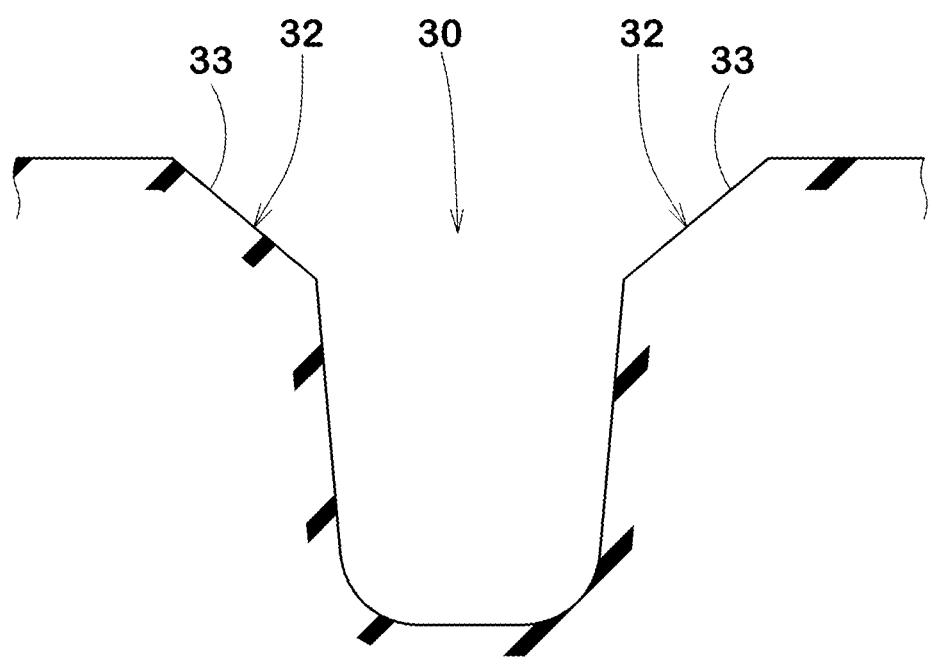
FIG. 8 is a cross-sectional view taken along the line C-C of FIG. 5.

FIG. 8 illustrates a cross-sectional view taken along the line C-C of FIG. 5. As illustrated in FIG. 8, the outboard shoulder lateral grooves 30, for example, each have a pair of groove edges each having a chamfer portion 32. The chamfer portion 32, for example, includes an inclined surface 33 inclined at an angle in a range of from 30 to 60 degrees with respect to the tire radial direction. Thus, braking performance can further be improved.

As illustrated in FIG. 5, each chamfer portion 32 of the outboard shoulder lateral grooves 30, in a tread plan view, preferably has a width decreasing continuously toward the outboard tread edge To. Thus, the ground contact pressure of the outboard shoulder land portion 12 can be uniform, improving braking performance further.

In the present embodiment, due to the above feature, the outboard shoulder lateral grooves 30 and the outboard middle groove-like portions 29 are displaced. Thus, in addition to the above effects, air pumping noise generated by the lateral grooves can be suppressed and noise performance can be improved. In order to further improve such effects, distances L7 in the tire circumferential direction between inner ends of the respective outboard shoulder lateral grooves 30 on the outboard shoulder circumferential groove 7 side and outer ends of the respective outboard middle groove-like portions 29 are preferably in a range of from 30% to 50% of the pitch length P2 in the tire circumferential direction of the outboard shoulder lateral grooves 30.

As illustrated in FIG. 6, a depth d3 of the outboard shoulder sipes 31, for example, is in a range of from 3.0 to 5.0 mm. Each chamfer portion 42 of the outboard shoulder sipes 31, for example, includes an inclined surface 43 inclined at an angle θ3 in a range of from 30 to 60 degrees with respect to the sipe-depth direction. A depth d4 of each chamfer portion 42, for example, is in a range of from 0.5 to 2.0 mm. In a tread plan view, a width W6 of each chamfer portion 42, for example, is in a range of from 2.0 to 4.0 mm. Such a chamfer portion 18 can help to improve braking performance for sure.

As illustrated in FIG. 5, each chamfer portion 42 of the outboard shoulder sipes 31 extends in the tire axial direction with a constant width. Thus, each chamfer portion 42, in cooperation with the outboard shoulder lateral grooves 30 and the chamfer portions 32, can help to improve steering stability and braking performance in various situations.

As illustrated in FIG. 7, distances L6 in the tire circumferential direction between the inner ends 31i of the respective outboard shoulder sipes 31 and the outer ends 29o of the respective outboard middle groove-like portions 29 are preferably equal to or less than 3% of the pitch length P1 (shown in FIG. 5), more preferably equal to or less than 1.0%. In some more preferred embodiments, virtual regions in which the outboard shoulder sipes 31 are extended in its length direction toward axially inwardly overlap the ends of the respective outboard middle groove-like portions 29 on the outboard tread edge To side. As a result, the above-mentioned effects can be exerted for sure.

As illustrated in FIG. 5, the outboard middle groove-like portions 29 are arranged in the tire circumferential direction with a pitch length same as the pitch length of the outboard shoulder sipes 31. As a result, the outboard middle groove-like portions 29 are arranged so as to have the above-mentioned relationship with the outboard shoulder sipes 31.

The outboard middle groove-like portions 29, for example, are inclined in the second direction (in each drawing, upward to right) which is opposite to the first direction with respect to the tire axial direction. A maximum angle θ4 with respect to the tire axial direction of the outboard middle groove-like portions 29 is greater than the angle with respect to the tire axial direction of the outboard shoulder lateral grooves 30 or the angle of the outboard shoulder sipes 31. Further, the maximum angle θ4 with respect to the tire axial direction of the outboard middle groove-like portions 29, for example, is in a range of from 35 to 55 degrees. Such outboard middle groove-like portions 29 can generate friction force in both tire circumferential direction and tire axial direction in a well-balanced manner when driving on wet roads.

As described above, in the present embodiment, the outboard middle groove-like portions 29 are configured as the outboard middle lateral grooves 24. The outboard middle lateral grooves 24, for example, each extend in an S-shaped manner including a curved portion 24a convex to the first circumferential side and a curved portion 24b convex to the second circumferential side. More specifically, each outboard middle lateral groove 24 is curved in an S-shaped manner such that angles with respect to the tire axial direction of the outboard middle lateral groove 24 at axially both ends are smaller than an angle with respect to the tire axial direction of the outboard middle lateral groove 24 at an axial central portion. The angles θ5 with respect to the tire axial direction of the outboard middle lateral groove 24 at axially both ends, for example, are in a range of from 7 to 22 degrees. Such outboard middle lateral grooves 24 can improve steering stability and noise performance while suppressing uneven wear around the both ends. Note that the present disclosure is not limited to such an aspect where the outboard middle lateral grooves 24 extend in an S-shaped manner.

In the present embodiment, the outboard middle lateral grooves 24, for example, each include a central straight element 35 that extends straight at an angle with respect to the tire axial direction, the angle forming the maximum angle in the outboard middle lateral groove 24. A length in the tire axial direction of the central straight element 35, for example, is in a range of from 48% to 64% of the width Wom in the tire axial direction of the ground contact surface of the outboard middle land portion 13.

In the present embodiment, the outboard middle groove-like portions 29, for example, extend with a constant depth. Note that the outboard middle groove-like portions 29 are not limited to such an aspect. In the specification, as another embodiment, the outboard middle groove-like portions 29 have a depth varying in a groove-length direction will be described later.

The center in the tire axial direction of the crown land portion 14 is located on the outboard tread edge To side with respect to the tire equator C. Thus, the ground contact surface of the crown land portion 14 includes an outboard ground contact surface 14a on the outboard tread edge To side with respect to the tire equator C and an inboard ground contact surface 14b on the inboard tread edge Ti side with respect to the tire equator C. The width Wco in the tire axial direction of the outboard ground contact surface 14a is greater than the width Wci in the tire axial direction of the inboard ground contact surface 14b. Specifically, the width Wco may be in a range of from 51% to 55% of the width We in the tire axial direction of the ground contact surface of the crown land portion 14. This can improve steering stability while suppressing uneven wear of the crown land portion 14.

The crown land portion 14 is provided with a plurality of crown sipes 20 inclined at an angle with respect to the tire axial direction. In the present embodiment, the crown sipes 20, for example, are inclined in the first direction with respect to the tire axial direction. An angle with respect to the tire axial direction of the crown sipes 20, for example, is in a range of from 15 to 45 degrees. The crown sipes 20 can provide a well-balanced frictional force in the tire circumferential direction and the tire axial direction during wet driving.

The crown sipes 20, for example, include a plurality of outboard crown sipes 21 and a plurality of inboard crown sipes 22. The outboard crown sipes 21 extend from the outboard crown circumferential groove 8 and terminate within the crown land portion 14. The inboard crown sipes 22 extend from the inboard crown circumferential groove 6 and terminate within the crown land portion 14. In some more preferred embodiments, the outboard crown sipes 21 and the inboard crown sipes 22 are arranged in parallel with each other. Such outboard crown sipes 21 and inboard crown sipes 22 can help to suppress uneven wear on the crown land portion 14 and the outboard middle land portion 15.

Preferably, the outboard crown sipes 21 and the inboard crown sipes 22 do not cross the tire equator C and do not cross the center in the tire axial direction of the crown land portion 14. A length L8 in the tire axial direction of the crown sipes 20, for example, is in a range of from 20% to 40% of the width We of the ground contact surface of the crown land portion 14.

In a tread plan view, respective virtual expanded regions of the outboard crown sipes 21 extending parallel to its length direction preferably overlap with the respective inboard crown sipes 22. Such an arrangement of the outboard crown sipes 21 and the inboard crown sipes 22 may provide pitch noise having a random signal having similar or equal intensity at different frequencies (i.e., white noise), improving noise performance.

Preferably, distances L9 in the tire circumferential direction between the inner ends of the respective outboard middle groove-like portions 29 on the outboard crown circumferential groove 8 and outer ends of the respective outboard crown sipes 21 on the outboard crown circumferential groove 8 are equal to or less than 15% of a pitch length P3 in the tire circumferential direction of the outboard crown sipes 21. This can make it easier for the chamfer portions of the outboard crown sipes 21 to come into contact with the ground and improve braking performance.

Preferably, the crown sipes 20 each include a pair of sipe edges each having a chamfer portion 23. Each chamfer portion 23 includes an inclined surface similar to the chamfer portions 42 (shown in FIG. 6) of the outboard shoulder sipes 31. A width and a depth of each chamfer portion 23 of the crown sipes 20 are preferably in a range of from 1.0 to 3.0 mm.

In the present embodiment, the outboard shoulder land portion 12, the outboard middle land portion 13 and the crown land portion 14 are provided only the above-mentioned grooves and sipes, and no grooves or sipes other than those are provided. Thus, the above effects can be exhibited for sure.

Hereinafter, other embodiments of the present disclosure will be described. In the drawings showing other embodiments, note that the elements already described are denoted with the same reference numerals as those described above, and that the above configurations can be applied.

Figure 9:
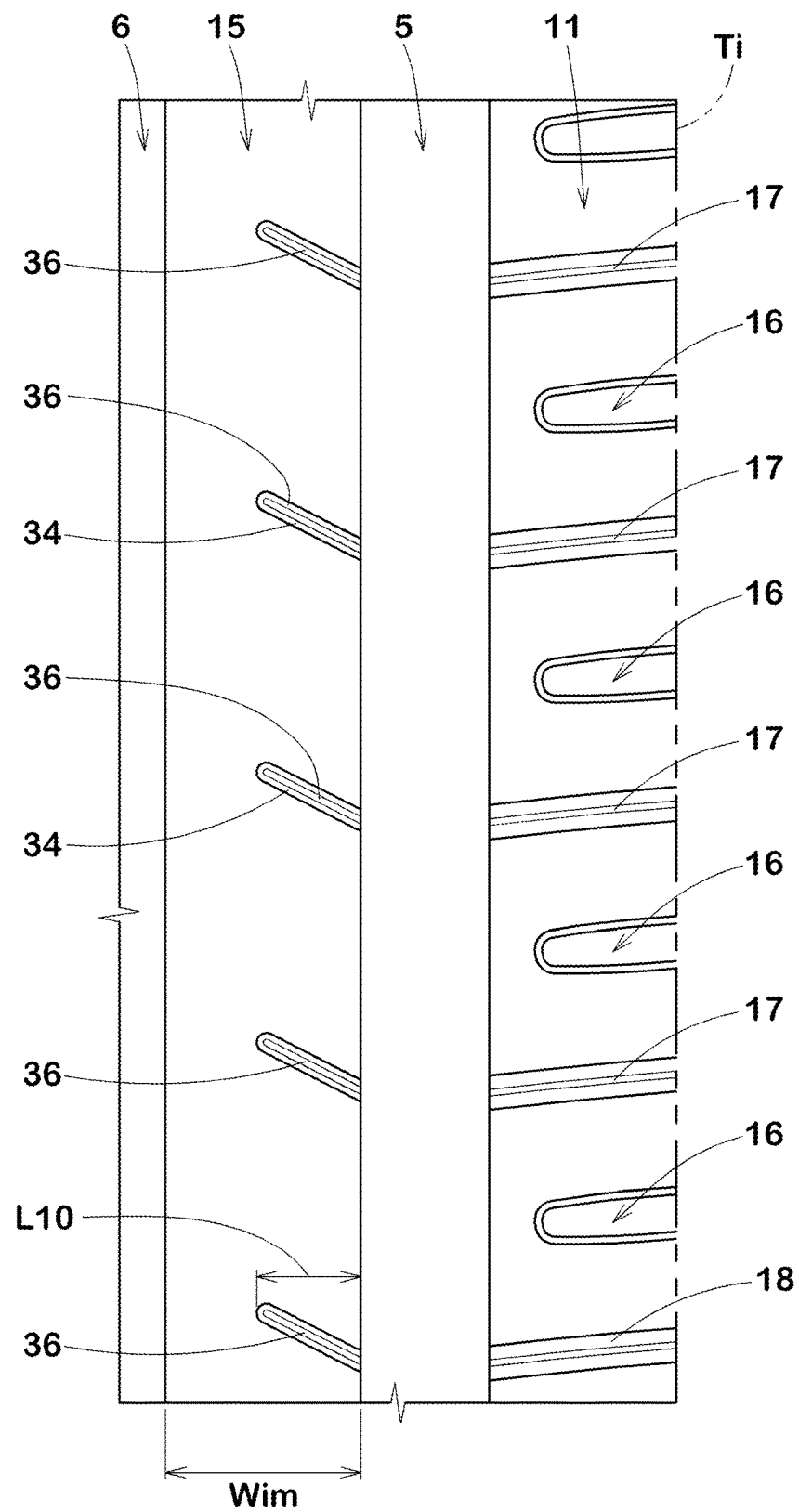
FIG. 9 is an enlarged view of the inboard shoulder land portion and the inboard middle land portion of the tread portion in accordance with another embodiment of the present disclosure.

FIG. 9 illustrates an enlarged view of the inboard shoulder land portion 11 and the inboard middle land portion 15 in accordance with another embodiment. As illustrated in FIG. 9, in this embodiment, the inboard middle land portion 15 is provided with a plurality of inboard middle sipes 36. Note that the other land portions of this embodiment have the same configuration as that of the above-described embodiment, and the description thereof is omitted here.

The inboard middle sipes 36 extend from the inboard shoulder circumferential groove 5 and terminate within the inboard middle land portion 15. A length L10 in the tire axial direction of the inboard middle sipes 36, for example, is in a range of from 30% to 70% of the width Wim of the inboard middle land portion 15. Such an inboard middle sipes 36 can help to improve the balance between wet performance and noise performance.

The inboard middle sipes 36 are inclined in the first direction with respect to the tire axial direction. An angle with respect to the tire axial direction of the inboard middle sipes 36, for example, is preferably in a range of from 15 to 45 degrees.

The inboard middle sipes 36 each include a pair of sipe edges each having a chamfer portion 34. Each chamfer portion 34 of the inboard middle sipes 36 is substantially the same as the chamfer portions 23 (shown in FIG. 5) of the outboard crown sipes 21 and the inboard crown sipes 22 described above. Further, the maximum depth of each chamfer portion 34 of the inboard middle sipes 36 are preferably smaller than the maximum depth of each chamfer portion of the inboard shoulder sipes 17. Furthermore, the maximum opening width of the inboard middle sipes 36 is preferably smaller than the maximum opening width of the inboard shoulder sipes 17. Such inboard middle sipes 36 can equalize the ground contact pressure of the inboard middle land portion 15 and further improve braking performance.

Figure 10:
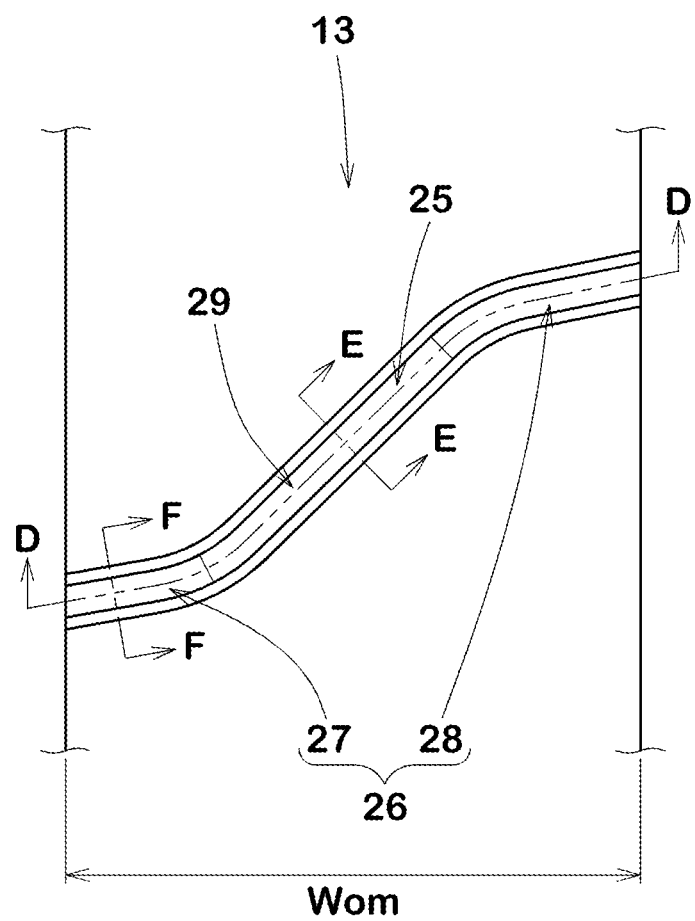
FIG. 10 is an enlarged view of an outboard middle lateral groove in accordance with another embodiment.
Figure 11:
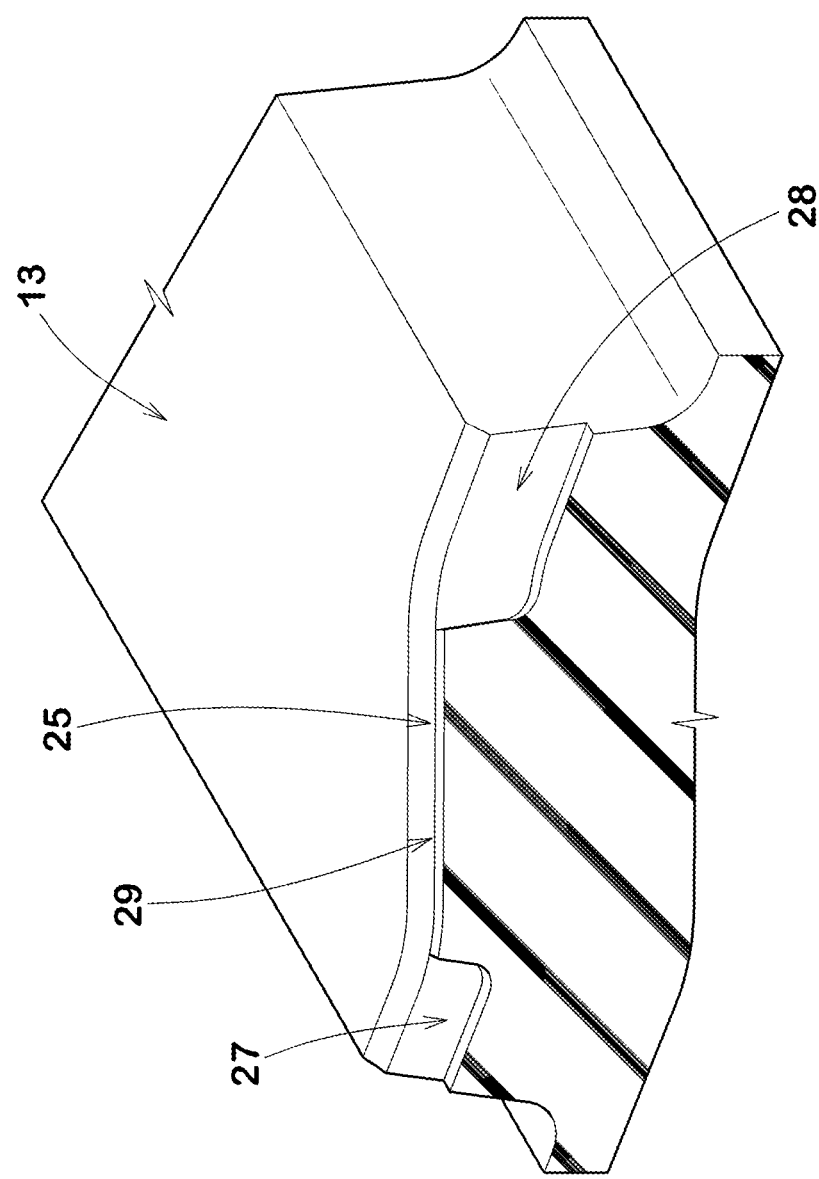
FIG. 11 is an enlarged perspective view showing the inside of the outboard middle lateral groove of FIG. 10.

Hereinafter, the outboard middle groove-like portions 29 in accordance with another embodiment of the present disclosure will be described. These outboard middle groove-like portions 29 are suitably applicable to the tread portion 2 having the above-mentioned pattern elements. FIG. 10 illustrates an enlarged view of one of the outboard middle groove-like portions 29 in accordance with another embodiment. FIG. 11 illustrates an enlarged perspective view showing the inside of the outboard middle lateral groove 29 of FIG. 10. As illustrated in FIG. 10 and FIG. 11, the outboard middle groove-like portions 29 according to this embodiment each include at least one shallow bottom portion 25 and at least one deep bottom portion 26 having a depth greater than that of the at least one shallow bottom portion 25. Such an outboard middle groove-like portions 29 can help to improve steering stability while ensuring wet performance. For the shape in tread plan view of the outboard middle groove-like portions 29, the above configuration can be applied.

Specifically, the at least one deep bottom portion 26 includes a first deep bottom portion 27 located on the outboard tread edge To side with respect to the center in the tire axial direction of the outboard middle land portion 13, and a second deep bottom portion 28 located on the inboard tread edge Ti side with respect to the center of the outboard middle land portion 13. The shallow bottom portion 25 is provided between the first deep bottom portion 27 and the second deep bottom portion 28. Such an outboard middle groove-like portion 29 can help to improve noise performance and ride comfort in addition to the above-mentioned effects.

Figure 12:
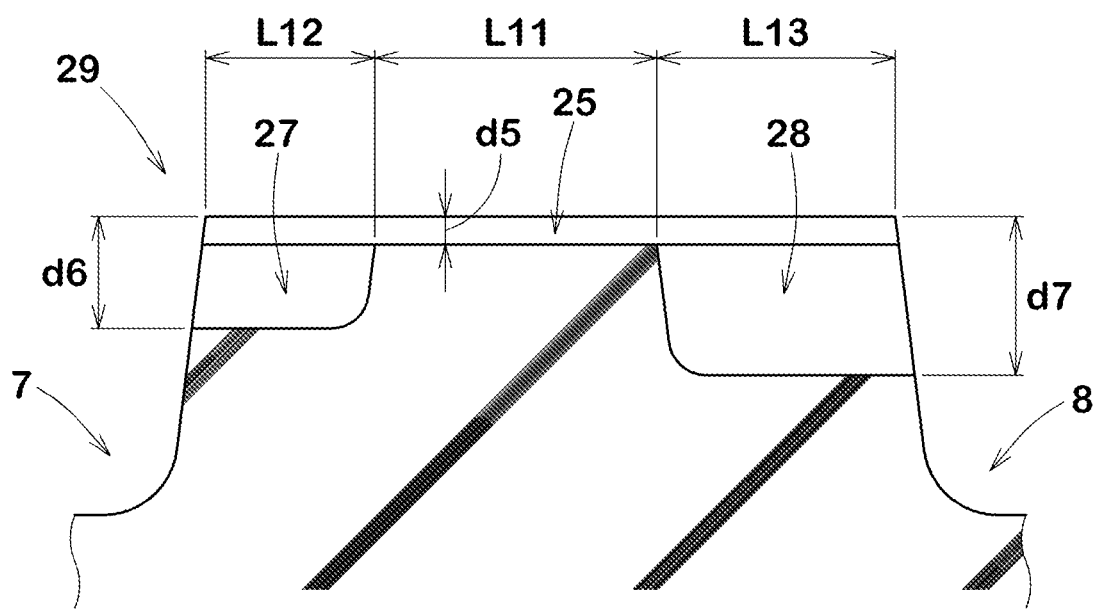
FIG. 12 is a cross-sectional view taken along the line D-D of FIG. 10.

FIG. 12 illustrates a cross-sectional view taken along the line D-D of FIG. 10. As illustrated in FIG. 12, a length L11 in the tire axial direction of the shallow bottom portion 25, for example, is in a range of from 20% to 90%, preferably 30% to 50%, of the width Wom (shown in FIG. 10) in the tire axial direction of the ground contact surface of the outboard middle land portion 13. Further, a depth d5 of the shallow bottom portion 25 is preferably in a range of from 15% to 25% of the maximum depth of the outboard middle groove-like portion 29. Such a shallow bottom portion 25 can improve wet performance and steering stability in a well-balanced manner.

A length L12 in the tire axial direction of the first deep bottom portion 27 and a length L13 in the tire axial direction of the second deep bottom portion 28, for example, are in a range of from 5% to 40%, preferably from 20% to 35%, of the width Wom in the tire axial direction of the ground contact surface of the outboard middle land portion 13. Further, the length L13 in the tire axial direction of the second deep bottom portion 28 is preferably greater than the length L12 in the tire axial direction of the first deep bottom portion 27. Specifically, the length L12 of the first deep bottom portion 27 is preferably in a range of from 60% to 80% of the length L13 of the second deep bottom portion 28. Thus, the second deep bottom portion 28 can provide excellent drainage. Note that when one or more of the lengths L11, L12 and L13 of the shallow bottom portion 25, the first deep bottom portion 27 and the second deep bottom portion 28, respectively, vary in the depth direction of the outboard middle groove-like portions 29, the length(s) should be measured at the middle position thereof in the depth direction.

The maximum depth d7 of the second deep bottom portion 28 is greater than the maximum depth d6 of the first deep bottom portion 27. Thus, the maximum depth d7 of the second deep bottom portion 28 is the maximum depth of the outboard middle groove-like portion 29. The maximum depth d6 of the first deep bottom portion 27, for example, is in a range of from 60% to 75% of the maximum depth d7 of the second deep bottom portion 28.

Figure 13:
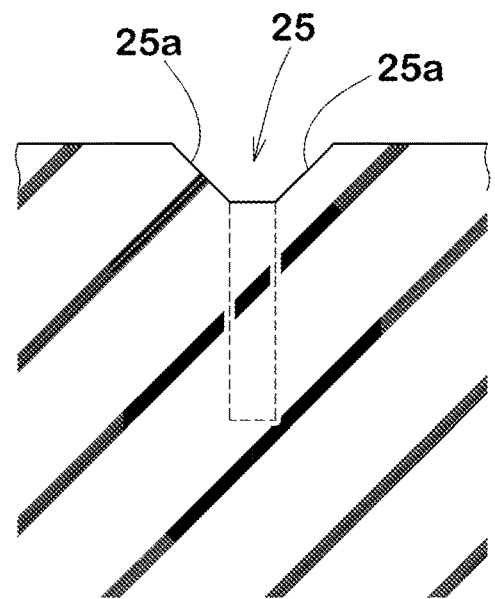
FIG. 13 is a cross-sectional view taken along the line E-E of FIG. 10.
Figure 14:
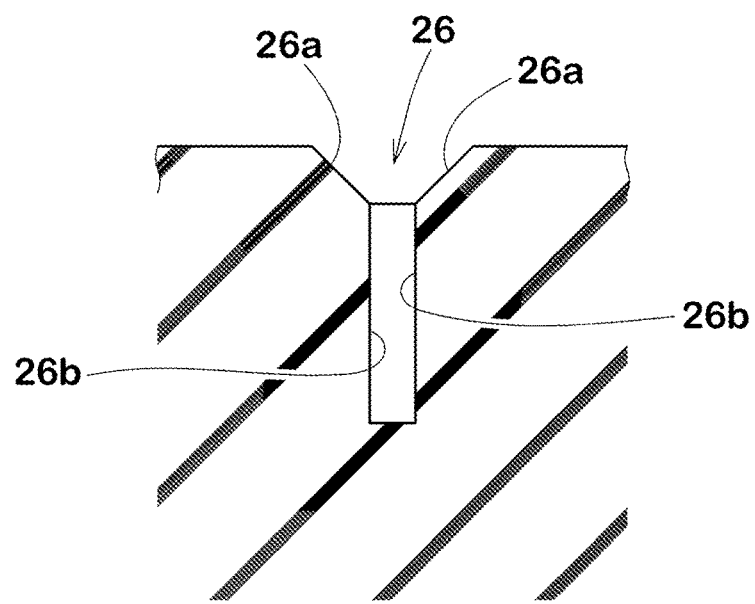
FIG. 14 is a cross-sectional view taken along the line F-F of FIG. 10.

FIG. 13 illustrates a cross-sectional view taken along the line E-E of FIG. 10, and FIG. 14 illustrates a cross-sectional view taken along the line F-F of FIG. 10. As illustrated in FIG. 13 and FIG. 14, the deep bottom portion 26 includes a pair of outer groove walls 26a connected to a pair of outer groove walls 25a of the shallow bottom portion 25, and a pair of inner groove walls 26b extending inwardly in the tire radial direction from the pair of outer groove wall 26a. The pair of inner groove walls 26b each has an angle with respect to the tire radial direction smaller than that of the pair of outer groove walls 26a. Specifically, an angle with respect to the tire radial direction of each outer groove wall 26a, for example, is in a range of from 40 to 50 degrees. An angle with respect to the tire radial direction of each inner groove wall 26b, for example, is equal to or less than 10 degrees. Such a deep bottom portion 26 can improve wet performance and steering stability in a well-balanced manner.

Hereinafter, other embodiments of the present disclosure will be described. In the drawings showing other embodiments, note that the elements already described are denoted with the same reference numerals as those described above, and that the above configurations can be applied.

Figure 15:
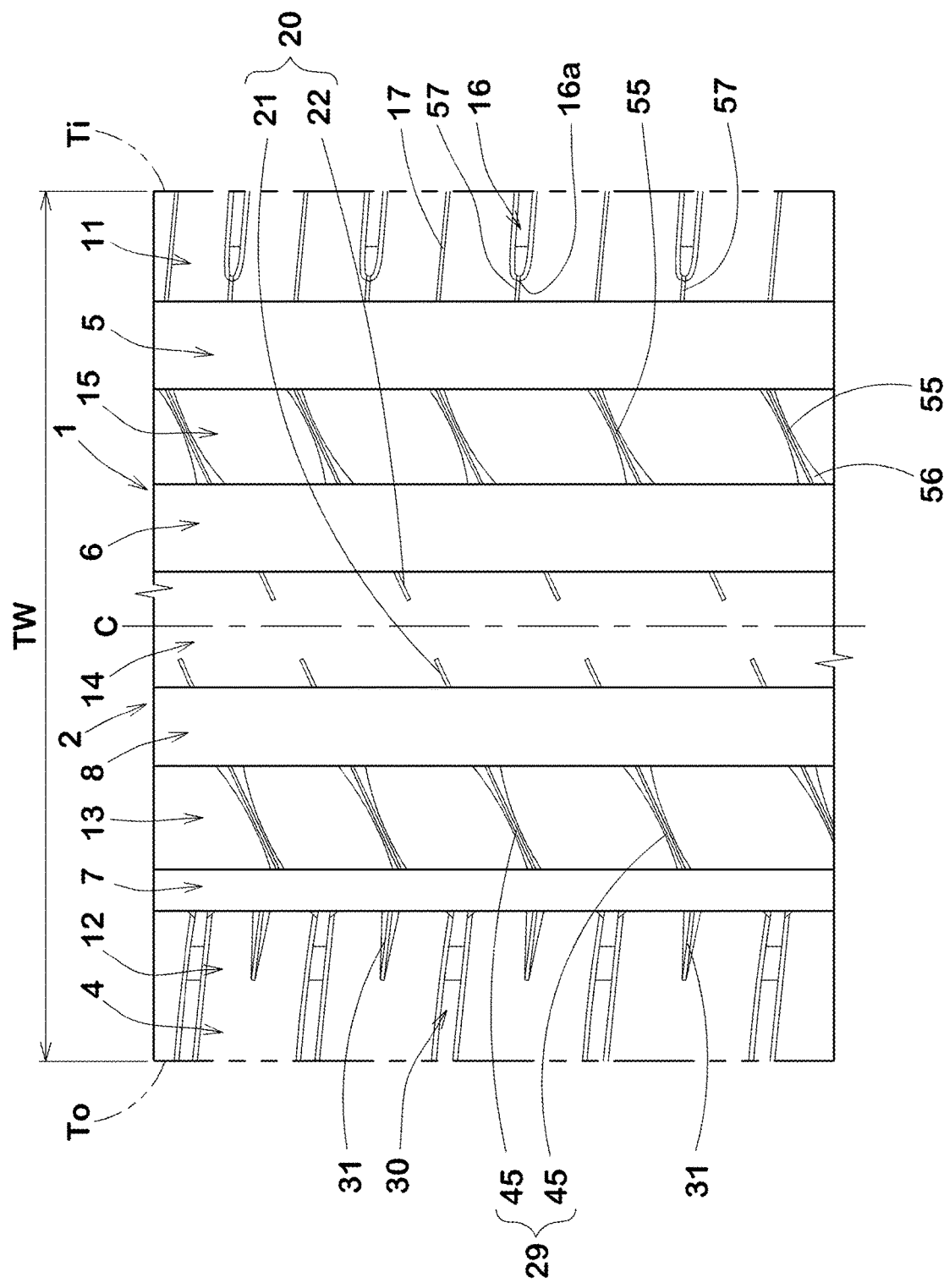
FIG. 15 is a development view of the tread portion in accordance with another embodiment of the present disclosure.
Figure 16:
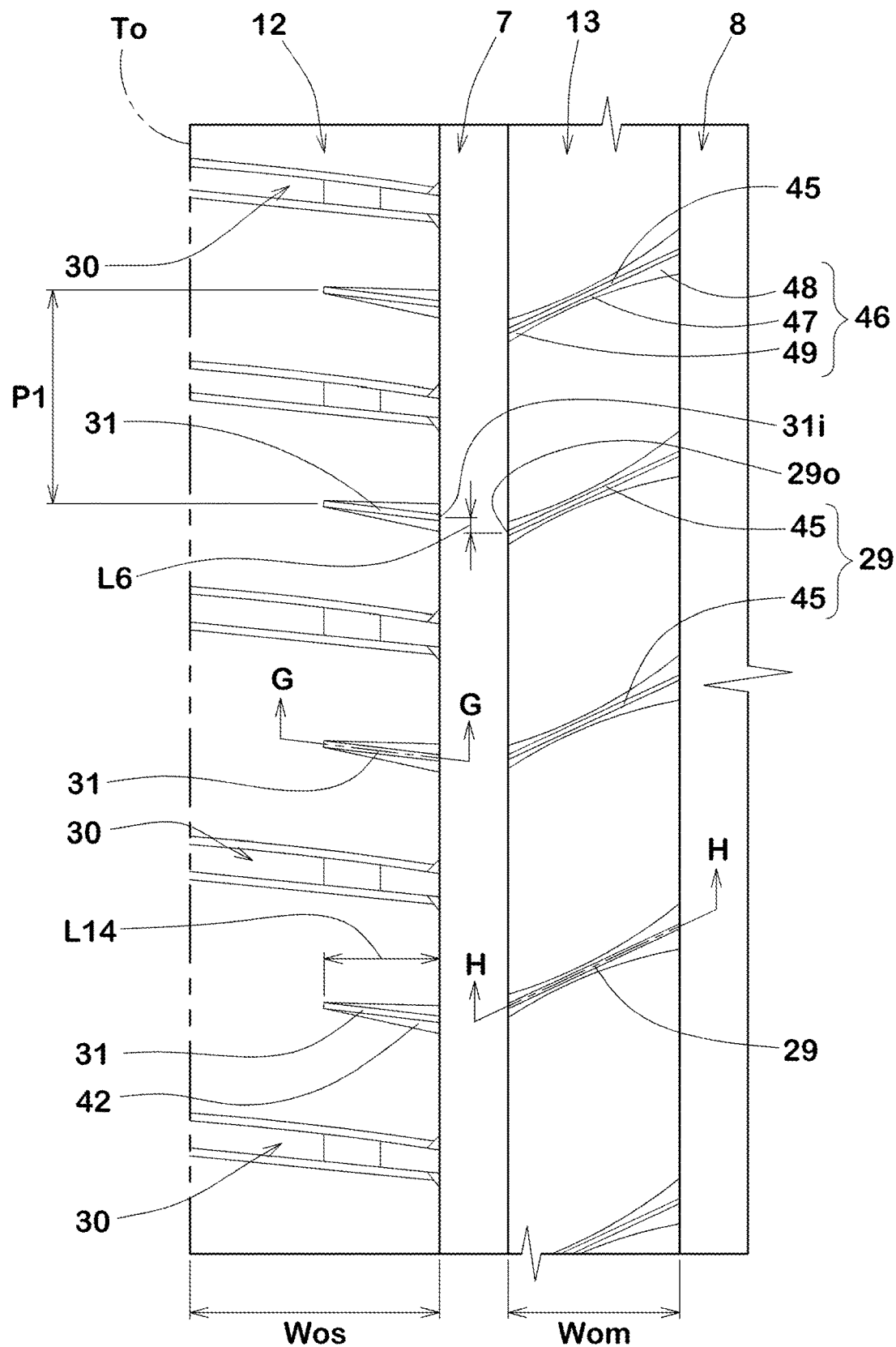
FIG. 16 is an enlarged view of the outboard shoulder land portion and the outboard middle land portion of FIG. 15.

FIG. 15 illustrates a development view of the tread portion 2 in accordance with another embodiment, and FIG. 16 illustrates an enlarged view of the outboard shoulder land portion 12 and the outboard middle land portion 13 of this embodiment. As illustrated in FIG. 16, in this embodiment, the outboard shoulder sipes 31 extend from the outboard shoulder circumferential groove 7 and terminate within the outboard shoulder land portion 12 without reaching the outboard tread edge To. Further, in this embodiment, the outboard middle groove-like portions 29 are configured as outboard middle sipes 45. The outboard middle sipes 45, in a cross-sectional view, each include a pair of wall surfaces having a maximum distance therebetween being 1.5 mm or less.

Also in this embodiment, as described above, distances L6 in the tire circumferential direction of the inner ends 31i of the respective outboard shoulder sipes 31 on the outboard shoulder circumferential groove 7 side and the outer ends 29o of the respective outboard middle groove-like portions 29 on the outboard shoulder circumferential groove 7 are equal to or less than 5% of the pitch length P1 in the tire circumferential direction of the outboard shoulder sipes 31. This makes it possible to improve steering stability and braking performance while ensuring wet performance.

The outboard shoulder sipes 31 each have a length L14 in the tire axial direction in a range of from 45% to 65% of the width Wos in the tire axial direction of the ground contact surface of the outboard shoulder land portion 12. Such an outboard shoulder sipes 31 can improve wet performance and steering stability in a well-balanced manner.

In this embodiment, the outboard shoulder sipes 31 each have a pair of sipe edges each having the chamfer portion 42. Each chamfer portion 42 has a chamfer width increasing continuously toward the outboard shoulder circumferential groove 7. The maximum chamfer width of each chamfer portion 42, for example, is in a range of from 1.0 to 3.0 mm, and the maximum chamfer depth of each chamfer portion 42, for example, is in a range of from 1.0 to 3.0 mm. As a result, the ground contact pressure acting on the outboard shoulder land portion 12 may be uniform, and steering stability and braking performance can further be improved.

Figure 17:
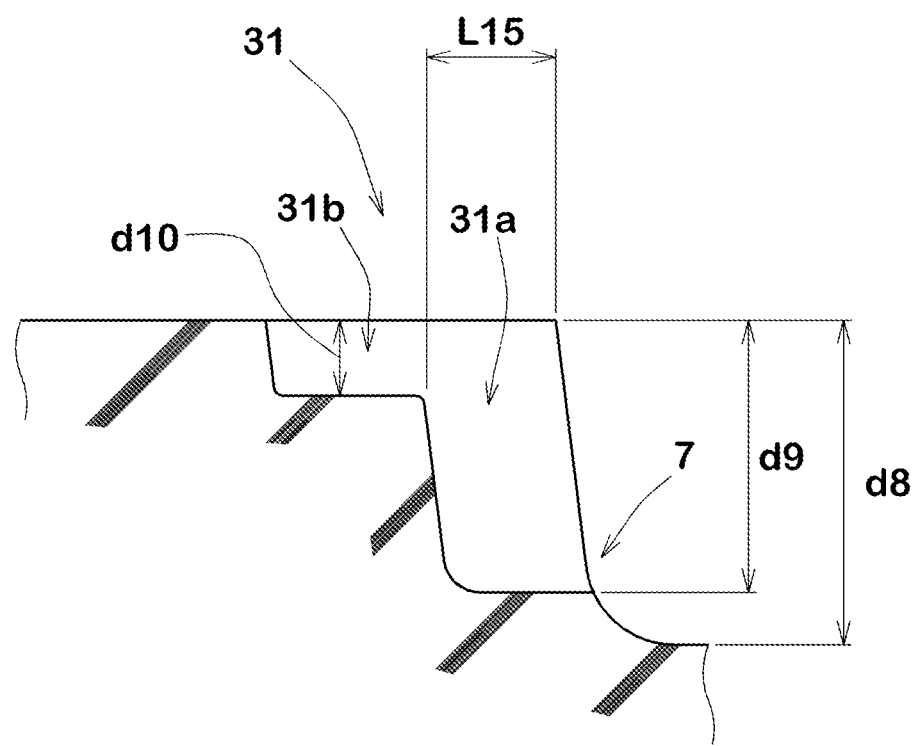
FIG. 17 is a cross-sectional view taken along the line G-G of FIG. 16.

FIG. 17 illustrates a cross-sectional view taken along the line G-G of FIG. 16. As illustrated in FIG. 17, the outboard shoulder sipes 31 each include a deep bottom portion 31a including the end thereof on the outboard shoulder circumferential groove 7 side, and a shallow bottom portion 31b having a depth smaller than that of the deep bottom portion 31a. The depth d9 of the deep bottom portion 31a, for example, is in a range of from 70% to 100% of the depth d8 of the outboard shoulder circumferential groove 7. The depth d10 of the shallow bottom portion 31b, for example, is in a range of from 2.0 to 4.0 mm. Preferably, the deep bottom portion 31a has an axial length L15 in a range of from 5% to 20% of the width Wos (shown in FIG. 16) in the tire axial direction of the ground contact surface of the outboard shoulder land portion 12. Such an outboard shoulder sipes 31 can help to improve wet performance and steering stability in a well-balanced manner.

As illustrated in FIG. 16, in this embodiment, the outboard middle sipes 45, for example, are inclined in the opposite direction to the outboard shoulder sipes 31 with respect to the tire axial direction. The outboard middle sipes 45, for example, each have an angle of from 20 to 30 degrees with respect to the tire axial direction. As a result, the outboard shoulder sipes 31 and the outboard middle sipes 45 can generate frictional forces in multiple directions, further improving wet performance.

The outboard middle sipes 45 each includes a pair of sipe edges each having a chamfer portion 46. Each chamfer portion 46 of the outboard middle sipes 45, for example, includes a constant-width portion 47, an inner widening-portion 48, and an outer widening-portion 49. The constant-width portion 47 extends in a sipe-length direction with a constant chamfer width. The inner widening-portion 48, for example, is connected to the constant-width portion 47 on its outboard crown circumferential groove 8 side, and has a chamfer width increasing continuously toward the outboard crown circumferential groove 8 from the constant-width portion 47. The outer widening-portion 49, for example, is connected to the constant-width portion 47 on its outboard shoulder circumferential groove 7 side, and has a chamfer width increasing continuously toward the outboard shoulder circumferential groove 7 from the constant-width portion 47. Such a chamfer portion 46 can improve braking performance while maintaining steering stability.

In some more preferred embodiments, the maximum chamfer width of the inner widening-portion 48 is greater than the maximum chamfer width of the outer widening-portion 49. As a result, a sufficient chamfer width can be secured on the tire equator C side where the ground contact pressure is relatively large, and the above-mentioned effect can further be enhanced.

Figure 18:
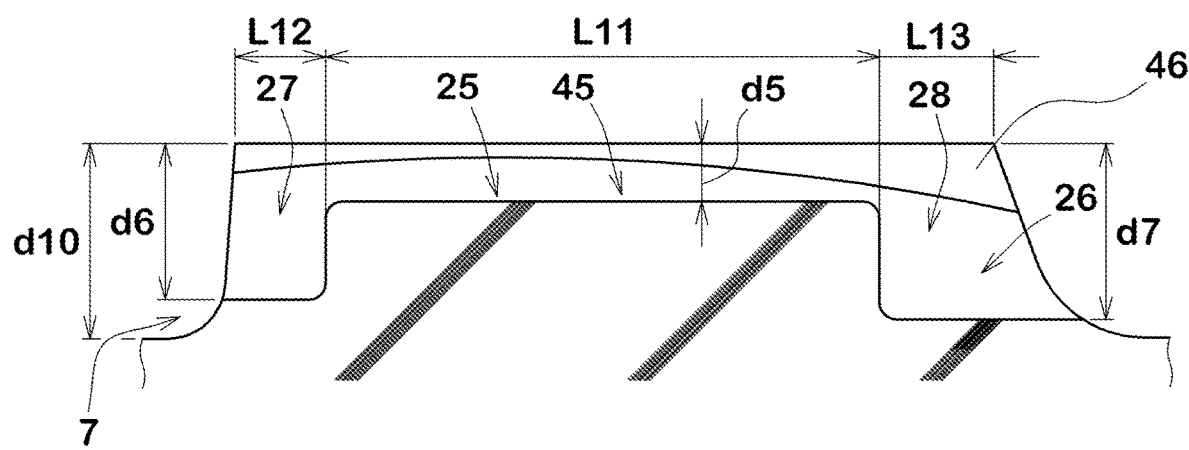
FIG. 18 is a cross-sectional view taken along the line H-H of FIG. 16.

FIG. 18 illustrates a cross-sectional view taken along the line H-H of FIG. 16. As illustrated in FIG. 18, each outboard middle sipe 45, similar to the outboard middle groove-like portions 29 above, includes a shallow bottom portion 25, and at least one deep bottom portion 26 having a depth greater than that of the shallow bottom portion 25. The at least one deep bottom portion 26 may include a first deep bottom portion 27 located on the outboard tread edge To side with respect to the center position in the tire axial direction of the outboard middle land portion 13, and a second deep bottom portion 28 located on the inboard tread edge Ti side with respect to the center position. The shallow bottom portion 25 is located between the first deep bottom portion 27 and the second deep bottom portion 28. Such an outboard middle sipes 45 can help to improve steering stability while ensuring wet performance.

The shallow bottom portion 25 has a length L11 in the tire axial direction in a range of from 60% to 90% of the width Wom (shown in FIG. 16) in the tire axial direction of the ground contact surface of the outboard middle land portion 13, for example. Further, the shallow bottom portion 25 has a depth d5, for example, in a range of from 1.0 to 3.0 mm. Such a shallow bottom portion 25 can improve set performance and steering stability in a well-balance manner.

The first deep bottom portion 27 has a length L12 in the tire axial direction and the second deep bottom portion 28 has a length L13 in the tire axial direction, and these lengths L12 and L13, for example, are in a range of from 5% to 20% of the width Wom in the tire axial direction of the ground contact surface of the outboard middle land portion 13. Further, the length L13 in the tire axial direction of the second deep bottom portion 28 is preferably greater than the length L12 in the tire axial direction of the first deep bottom portion 27. Specifically, the length L12 of the first deep bottom portion 27 is preferably in a range of from 60% to 75% of the length L13 of the second deep bottom portion 28. Thus, the second deep bottom portion 28 can provide excellent drainage.

The maximum depth d6 of the first deep bottom portion 27 and the maximum depth d7 of the second deep bottom portion 28 are preferably in a range of from 70% to 100% of the maximum depth d10 of the outboard shoulder circumferential groove 7. The maximum depth d7 of the second deep bottom portion 28 is preferably greater than the maximum depth d6 of the first deep bottom portion 27. Thus, the maximum depth d7 of the second deep bottom portion 28 is the maximum depth of the outboard middle sipe 45. The maximum depth d6 of the first deep bottom portion 27, for example, is preferably in a range of from 80% to 95% of the maximum depth d7 of the second deep bottom portion 28. Thus, steering stability and braking performance can be further improved while ensuring wet performance.

As illustrated in FIG. 15, in this embodiment, the inboard middle land portion 15, for example, is provided with a plurality of inboard middle traverse-sipes 55. The inboard middle traverse-sipes 55 traverse the inboard middle land portion 15 completely in the tire axial direction. In some preferred embodiments, the inboard middle traverse-sipes 55 are inclined in the same direction as the outboard middle groove-like portions 29 with respect to the tire axial direction. In some more preferred embodiment, the inboard middle traverse-sipes 55 extend in parallel with the outboard middle groove-like portions 29.

Preferably, the inboard middle traverse-sipes 55 each have a pair of sipe edges each having a chamfer portion 56. Each chamfer portion 56 of the inboard middle traverse-sipes 55 has a chamfer width increasing toward both ends in the tire axial direction thereof from a middle portion. This feature can help to improve steering stability and braking performance further.

In this embodiment, the inboard shoulder land portion 11 is provided with a plurality of inboard shoulder connecting sipes 57 extending from the inner ends 16a of the respective inboard shoulder lateral grooves 16 to the inboard shoulder circumferential groove 5. Such inboard shoulder connecting sipes 57 can help to improve wet performance.

While the particularly preferable embodiments of the tire in accordance with the present disclosure have been described in detail, the present disclosure is not limited to the illustrated embodiments, but can be modified and carried out in various aspects within the scope of the disclosure.

EXAMPLE

Figure 19:
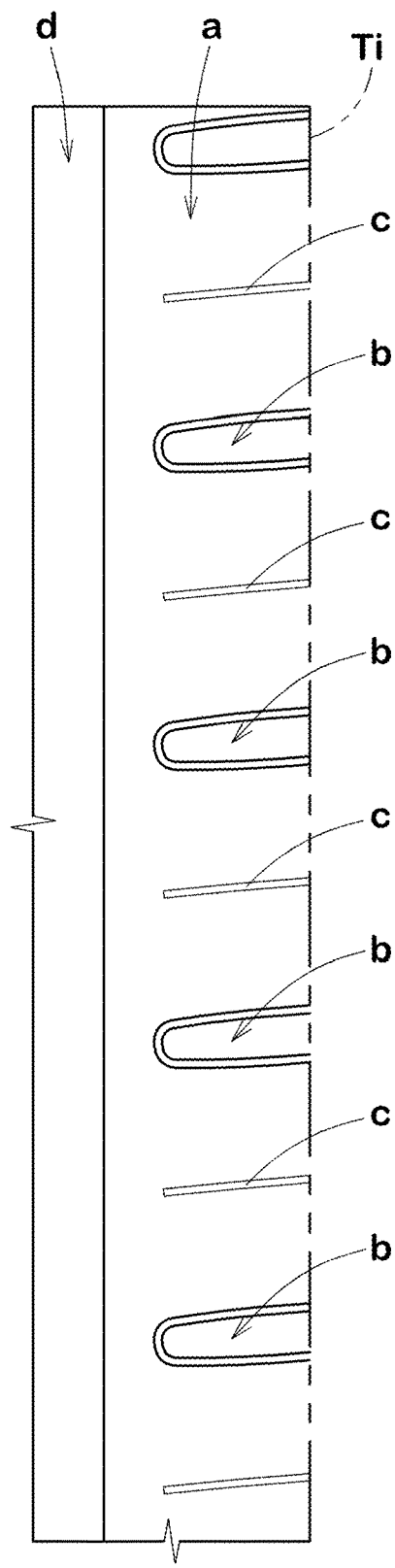
FIG. 19 is an enlarged view of the inboard shoulder land portion in accordance with a comparative example.

Tires of size 235/55R19 with the basic pattern of FIG. 1 were prepared based on the specifications in Table 1. In addition, some standard tires for comparing various performances were also prepared. Each tread portion of the standard tires has the five land portions having the respective widths the same as the tread pattern shown in FIG. 1, but these land portions are not provided with any grooves nor sipes. For a comparative example, as illustrated in FIG. 19, tires each of which includes the inboard shoulder land portion (a) provided with the inboard shoulder lateral grooves (b) and the inboard shoulder sipes (c) were also prepared. In the comparative example, the inboard shoulder sipes (c) are not communicated with the inboard shoulder circumferential groove (d), and are not provided with chamfer portions. The tires of comparative example, except for the above-mentioned feature, have the substantially same tread pattern shown in FIG. 1. Then, wet performance, noise performance and braking performance of these test tires are tested. The common specifications and test methods of each test tire are as follows.

Rim size: 19×7.0 J

Tire inner pressure: 230 kPa

Test vehicle: displacement 2000 cc, four-wheel-drive vehicle

Tire location: all wheels

Wet Performance Test:

The wet performance when driving on a wet road surface with the above test vehicle was evaluated by the driver's sensuality. The test results are shown in Table 1 using a score where the wet performance of the comparative example is set to 100. The larger the value, the better the wet performance.

Noise Performance Test:

The above test vehicle was made to run on a dry road surface at 40 to 100 km/h, and the maximum sound pressure of noise inside the vehicle was measured. The test results are shown in Table 1 using an index of the reduction of sound pressure from the sound pressure of the standard tire. In Table 1, the reduction of sound pressure of the comparative example is set to 100. The larger the index, the smaller the maximum sound pressure of the noise, which means the better noise performance.

Braking Performance Test:

The braking distance when the above test vehicle was suddenly braked from 100 km h on a dry road surface was measured. The test results are shown in table 1 using an index of the difference from the braking distance of the standard tire. In Table 1, the difference of the comparative example is set to 100. The larger the index, the better the braking performance.

Table 1 shows the rest results.

TABLE 1

|  | Comparative Example | Ex. 1 | Ex. 2 | Ex. 3 | Ex. 4 | Ex. 5 | Ex. 6 | Ex. 7 | Ex. 8 | Ex. 9 |
| --- | --- | --- | --- | --- | --- | --- | --- | --- | --- | --- |
| Inboard shoulder land portion shape | FIG. 19 | FIG. 3 | FIG. 3 | FIG. 3 | FIG. 3 | FIG. 3 | FIG. 3 | FIG. 3 | FIG. 3 | FIG. 3 |
| Width Wis of inboard shoulder land portion/width Ec of crown land portion (%) | 95 | 95 | 85 | 90 | 97 | 99 | 95 | 95 | 95 | 95 |
| Length L3 of inboard shoulder lateral grooves/width Wis of inboard shoulder land portion (%) | 78 | 78 | 78 | 78 | 78 | 78 | 65 | 70 | 85 | 90 |
| Wet performance (score) | 100 | 110 | 115 | 112 | 107 | 104 | 103 | 106 | 113 | 115 |
| Noise performance (index) | 100 | 113 | 108 | 111 | 112 | 111 | 115 | 114 | 110 | 106 |
| Braking performance (index) | 100 | 122 | 111 | 118 | 123 | 125 | 125 | 123 | 120 | 114 |

From the test results, it is confirmed that the tires of the examples 1 to 9 can improve noise performance and braking performance while ensuring wet performance.

Figure 20:
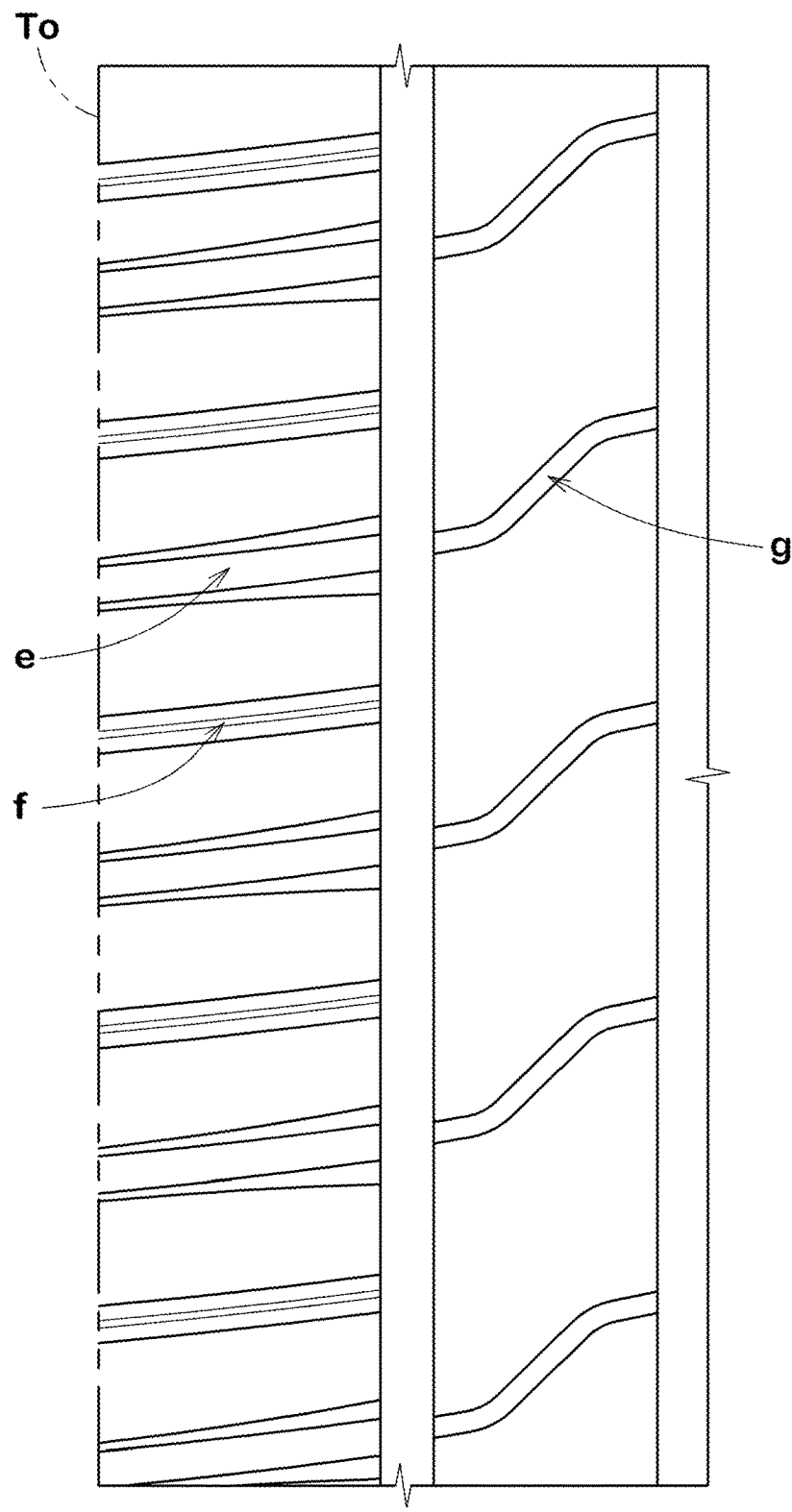
FIG. 20 is an enlarged view of the outboard shoulder land portion and the outboard middle land portion in accordance with a reference tire.

As a reference example, as illustrated in FIG. 20, a tire which includes the outboard shoulder sipes f and the outboard middle groove-like portions g which are staggered in the tire circumferential direction, and the inner ends of the respective outboard shoulder lateral grooves e face the outer ends of the respective outboard middle groove-like portions g. The reference example tire has substantially the same pattern as that shown in FIG. 1, except for the above features. In addition to the wet performance and braking performance described above, steering stability is also tested for the test tires. The steering stability test method is as follows.

Steering Stability Test:

The steering stability when driving on a dry road surface with the above test vehicle was evaluated by the driver's sensuality. The test results are shown in Table 2 using a score where the steering stability of the reference example tire is set to 100. The larger the value, the better the steering stability.

Table 2 shows the rest results. In Table 2, wet performance of the examples is shown using a score where the wet performance of the reference example is set to 100. In Table 2, braking performance of the examples is shown using an index where the reference example is set to 100.

TABLE 2

|  | Reference Example | Ex. 10 | Ex. 11 | Ex. 12 | Ex. 13 | Ex. 14 | Ex. 15 | Ex. 16 | Ex. 17 |
| --- | --- | --- | --- | --- | --- | --- | --- | --- | --- |
| Distances L3 between inner ends of outboard shoulder sipes and outer ends of outboard middle groove-like portions/pitch length P1 of outboard shoulder sipes | 50.0 | 1.0 | 3.0 | 5.0 | 1.0 | 1.0 | 1.0 | 1.0 | 1.0 |
| Maximum angle θ2 of outboard middle groove-like portions (deg.) | 45 | 45 | 45 | 45 | 50 | 40 | 35 | 25 | 45 |
| Angle θ3 of both end portions of outboard middle groove-like portion (deg.) | 10 | 10 | 10 | 10 | 5 | 15 | 20 | 25 | 10 |
| Shallow bottom portions and deep bottom portions of outboard middle groove-like portions | presence | presence | presence | presence | presence | presence | presence | presence | none |
| Wet performance (score) | 100 | 102 | 101 | 100 | 103 | 102 | 100 | 100 | 103 |
| Steering stability (score) | 100 | 110 | 108 | 104 | 109 | 110 | 108 | 107 | 106 |
| Braking performance (index) | 100 | 118 | 113 | 108 | 115 | 117 | 113 | 111 | 112 |

From the test results, it is confirmed that the tires of the examples 10 to 17 can improve steering stability and braking performance while ensuring wet performance.

[Additional Notes]

The present disclosure includes the following aspects.

[Note 1]

A tire comprising:

a tread portion having a designated mounting direction to a vehicle, the tread portion comprising an outboard tread edge and an inboard tread edge which are respectively located outside and inside of a vehicle when being mounted to the vehicle, four circumferential grooves extending continuously in a tire circumferential direction between the outboard tread edge and the inboard tread edge, and five land portions divided by the four circumferential grooves, the four circumferential grooves comprising an inboard shoulder circumferential groove located nearest to the inboard tread edge in the four circumferential grooves, the five land portions comprising an inboard shoulder land portion disposed outward in the tire axial direction of the inboard shoulder circumferential groove, the inboard shoulder land portion having a ground contact surface with a smallest width in the tire axial direction in the five land portions, the inboard shoulder land portion being provided with a plurality of inboard shoulder lateral grooves and a plurality of inboard shoulder sipes, the plurality of inboard shoulder lateral grooves comprising inner ends that are located by a distance in the tire axial direction away from the inboard shoulder circumferential groove, the plurality of inboard shoulder lateral grooves extending outward in the tire axial direction from the inner ends to a location beyond the inboard tread edge, and the plurality of inboard shoulder sipes extending from the inboard shoulder circumferential groove to a location beyond the inboard tread edge.

[Note 2]

The tire according to note 1, wherein the five land portions comprise ground contact surfaces having respective widths in the tire axial direction such that the nearer to the outboard tread edge the larger the width.

[Note 3]

The tire according to note 1 or 2, wherein the five land portions comprise a crown land portion disposed on a tire equator, and the width in the tire axial direction of the ground contact surface of the inboard shoulder land portion is equal to or more than 90% of a width in the tire axial direction of the ground contact surface of the crown land portion.

[Note 4]

The tire according to note 3, wherein a center in the tire axial direction of the crown land portion is located on an outboard tread edge side with respect to the tire equator.

[Note 5]

The tire according to any one of notes 1 to 4, wherein the five land portions comprise an inboard middle land portion adjacent to the inboard shoulder land portion via the inboard shoulder circumferential groove, and the inboard middle land portion is provided with a plurality of inboard middle lateral grooves that traverses the inboard middle land portion completely in the tire axial direction.

[Note 6]

The tire according to note 5, wherein distances in the tire circumferential direction between ends of the respective inboard middle lateral grooves on an inboard shoulder circumferential groove side and ends of the respective inboard shoulder sipes on the inboard shoulder circumferential groove side are equal to or less than 15% of a distance in the tire circumferential direction at the inboard tread edge from one of the plurality of inboard shoulder lateral grooves to one of the plurality of inboard shoulder sipes which are directly adjacent in the tire circumferential direction.

[Note 7]

The tire according to any one of notes 1 to 4, wherein the five land portions comprise an inboard middle land portion adjacent to the inboard shoulder land portion via the inboard shoulder circumferential groove, the inboard middle land portion is provided with a plurality of inboard middle sipes, and the plurality of inboard middle sipes extends from the inboard shoulder circumferential groove and terminates within the inboard middle land portion.

[Note 8]

The tire according to any one of notes 1 to 4, wherein the five land portions comprise an inboard middle land portion adjacent to the inboard shoulder land portion via the inboard shoulder circumferential groove, the inboard middle land portion is provided with a plurality of inboard middle traverse-sipes that traverses the inboard middle land portion completely in the tire axial direction, and the plurality of inboard middle traverse-sipes each comprises a pair of sipe edges each having a chamfer portion.

[Note 9]

The tire according to note 8, wherein a chamfer width of the chamfer portion of each of the plurality of inboard middle traverse-sipes increases toward both sides from a middle portion in the tire axial direction.

[Note 10]

The tire according to note 8 or 9, wherein
the inboard shoulder land portion is provided with a plurality of inboard shoulder connecting sipes that extends from the respective inner ends of the plurality of inboard shoulder lateral grooves to the inboard shoulder circumferential groove.

[Note 11]

The tire according to any one of notes 1 to 11, wherein
the four circumferential grooves comprise an outboard shoulder circumferential groove located nearest to the outboard tread edge in the four circumferential grooves,
the five land portions comprise an outboard shoulder land portion having the outboard tread edge, and an outboard middle land portion adjacent to the outboard shoulder land portion via the outboard shoulder circumferential groove,
the outboard shoulder land portion is provided with a plurality of outboard shoulder lateral grooves and a plurality of outboard shoulder sipes,
the plurality of outboard shoulder lateral grooves extends from the outboard shoulder circumferential groove to a location beyond the outboard tread edge,
the plurality of outboard shoulder sipes is in communication with the outboard shoulder circumferential groove,
the plurality of outboard shoulder sipes each comprises a pair of sipe edges each having a chamfer portion, the chamfer portion extending over an entire region of each sipe edge, in a region from the outboard shoulder circumferential groove to the outboard tread edge,
the outboard middle land portion is provided with a plurality of outboard middle groove-like portions that traverses the outboard middle land portion completely in the tire axial direction, and
distances in the tire circumferential direction between inner ends of the respective outboard shoulder sipes on an outboard shoulder circumferential groove side and outer ends of the respective outboard middle groove-like portions on the outboard shoulder circumferential groove side are equal to or less than 5% of a pitch length in the tire circumferential direction of the plurality of outboard shoulder sipes.

[Note 12]

The tire according to note 11, wherein
the plurality of outboard middle groove-like portions each comprises a pair of wall surfaces extending along a tire radial direction, and
the plurality of outboard middle groove-like portions comprises a plurality of outboard middle sipes in which a maximum distance between the pair of wall surfaces is equal to or less than 1.5 mm.

[Note 13]

The tire according to note 11, wherein
the plurality of outboard middle groove-like portions each comprises a pair of wall surfaces extending along a tire radial direction,
the plurality of outboard middle groove-like portions comprises a plurality of outboard middle lateral grooves in which a maximum distance between the pair of wall surfaces is greater than 1.5 mm, and
the plurality of outboard middle lateral grooves extends in an S-shaped manner including a curved portion convex to a first circumferential side and a curved portion convex to a second circumferential side.

[Note 14]

The tire according to any one of notes 11 to 13, wherein
the outboard middle groove-like portions each comprises at least one shallow bottom portion and at least one deep bottom portion having a depth greater than that of the at least one shallow bottom portion,
the at least one deep bottom portion comprises
a first deep bottom portion located on an outboard tread edge side with respect to a center in the tire axial direction of the outboard middle land portion, and
a second deep bottom portion located on an inboard tread edge side with respect to the center of the outboard middle land portion, and
the at least one shallow bottom portion is located between the first deep bottom portion and the second deep bottom portion.

[Note 15]

The tire according to any one of notes 11 to 14, wherein
the plurality of outboard shoulder lateral grooves each comprises a pair of groove edges each having a chamfer portion,
the plurality of outboard shoulder sipes terminates within the outboard shoulder land portion without reaching the outboard tread edge, and
the plurality of outboard shoulder sipes each comprises a deep bottom portion including an end on an outboard shoulder circumferential groove side and a shallow bottom portion having a depth smaller than that of the deep bottom portion.

[Note 16]

The tire according to any one of notes 1 to 15, wherein
the five land portions comprise a crown land portion disposed on a tire equator and an inboard middle land portion adjacent to the inboard shoulder land portion via the inboard shoulder circumferential groove,
the width in the tire axial direction of the ground contact surface of the inboard shoulder land portion is equal to or more than 90% of a width in the tire axial direction of the ground contact surface of the crown land portion,
a center in the tire axial direction of the crown land portion is located on an outboard tread edge side with respect to the tire equator,
the inboard middle land portion is provided with a plurality of inboard middle traverse-sipes that traverses the inboard middle land portion completely in the tire axial direction, and
the plurality of inboard middle traverse-sipes each comprises a pair of sipe edges each having a chamfer portion.

[Note 17]

The tire according to note 16, wherein
the inboard shoulder land portion is provided with a plurality of inboard shoulder connecting sipes extending from the respective inner ends of the plurality of inboard shoulder lateral grooves to the inboard shoulder circumferential groove.

[Note 18]

The tire according to any one of notes 1 to 17, wherein
the four circumferential grooves comprise an outboard shoulder circumferential groove located nearest to the outboard tread edge in the four circumferential grooves,
the five land portions comprise an outboard shoulder land portion having the outboard tread edge, and an outboard middle land portion adjacent to the outboard shoulder land portion via the outboard shoulder circumferential groove,
the outboard shoulder land portion is provided with a plurality of outboard shoulder lateral grooves and a plurality of outboard shoulder sipes, the plurality of outboard shoulder lateral grooves extends from the outboard shoulder circumferential groove to a location beyond the outboard tread edge, the plurality of outboard shoulder sipes is in communication with the outboard shoulder circumferential groove, the plurality of outboard shoulder sipes each comprises a pair of sipe edges each having a chamfer portion, the chamfer portion extending over an entire region of each sipe edge, in a region from the outboard shoulder circumferential groove to the outboard tread edge, the outboard middle land portion is provided with a plurality of outboard middle groove-like portions that traverses the outboard middle land portion completely in the tire axial direction, distances in the tire circumferential direction between inner ends of the respective outboard shoulder sipes on an outboard shoulder circumferential groove side and outer ends of the respective outboard middle groove-like portions on the outboard shoulder circumferential groove side are equal to or less than 5% of a pitch length in the tire circumferential direction of the plurality of outboard shoulder sipes, the outboard middle groove-like portions each comprises a pair of wall surfaces extending along a tire radial direction, and the plurality of outboard middle groove-like portions comprises a plurality of outboard middle sipes in which a maximum distance between the pair of wall surfaces is equal to or less than 1.5 mm.

[Note 19]

The tire according to note 18, wherein the outboard middle groove-like portions each comprises at least one shallow bottom portion and at least one deep bottom portion having a depth greater than that of the at least one shallow bottom portion, the at least one deep bottom portion comprises
- a first deep bottom portion located on an outboard tread edge side with respect to a center in the tire axial direction of the outboard middle land portion, and
- a second deep bottom portion located on an inboard tread edge side with respect to the center of the outboard middle land portion, and the at least one shallow bottom portion is located between the first deep bottom portion and the second deep bottom portion.

[Note 20]

The tire according to note any one of notes 1 to 19, wherein the four circumferential grooves comprise an outboard shoulder circumferential groove located nearest to the outboard tread edge in the four circumferential grooves, the five land portions comprise an outboard shoulder land portion having the outboard tread edge, and an outboard middle land portion adjacent to the outboard shoulder land portion via the outboard shoulder circumferential groove, the outboard shoulder land portion is provided with a plurality of outboard shoulder lateral grooves and a plurality of outboard shoulder sipes, the plurality of outboard shoulder lateral grooves extends from the outboard shoulder circumferential groove to a location beyond the outboard tread edge, the plurality of outboard shoulder sipes is in communication with the outboard shoulder circumferential groove, the plurality of outboard shoulder sipes each comprises a pair of sipe edges each having a chamfer portion, the chamfer portion extending over an entire region of each sipe edge, in a region from the outboard shoulder circumferential groove to the outboard tread edge, the outboard middle land portion is provided with a plurality of outboard middle groove-like portions that traverses the outboard middle land portion completely in the tire axial direction, distances in the tire circumferential direction between inner ends of the respective outboard shoulder sipes on an outboard shoulder circumferential groove side and outer ends of the respective outboard middle groove-like portions on the outboard shoulder circumferential groove side are equal to or less than 5% of a pitch length in the tire circumferential direction of the plurality of outboard shoulder sipes, and the outboard shoulder lateral grooves each comprises a pair of groove edges each having a chamfer portion.

The invention claimed is:

1. A tire comprising:
a tread portion having a designated mounting direction to a vehicle, the tread portion comprising an outboard tread edge and an inboard tread edge which are respectively located outside and inside of a vehicle when being mounted to the vehicle, four circumferential grooves extending continuously in a tire circumferential direction between the outboard tread edge and the inboard tread edge, and five land portions divided by the four circumferential grooves, the four circumferential grooves comprising an inboard shoulder circumferential groove located nearest to the inboard tread edge in the four circumferential grooves, the five land portions comprising an inboard shoulder land portion disposed outward in the tire axial direction of the inboard shoulder circumferential groove, the inboard shoulder land portion having a ground contact surface with a smallest width in the tire axial direction in the five land portions, the inboard shoulder land portion being provided with a plurality of inboard shoulder lateral grooves and a plurality of inboard shoulder sipes, the plurality of inboard shoulder lateral grooves comprising inner ends that are located by a distance in the tire axial direction away from the inboard shoulder circumferential groove, the plurality of inboard shoulder lateral grooves extending outward in the tire axial direction from the inner ends to a location beyond the inboard tread edge, the plurality of inboard shoulder sipes extending from the inboard shoulder circumferential groove to a location beyond the inboard tread edge, the five land portions comprise an inboard middle land portion adjacent to the inboard shoulder land portion via the inboard shoulder circumferential groove, the inboard middle land portion is provided with a plurality of inboard middle traverse-sipes that traverses the inboard middle land portion completely in the tire axial direction, the plurality of inboard middle traverse-sipes each comprise a pair of sipe edges each having a chamfer portion extending over an entire length of the inboard middle-traverse sipe, each chamfer portion has an inboard end on an inboard tread edge side and an outboard end on an outboard tread edge side, and a chamfer width of the inboard end in the tire circumferential direction is smaller than a chamfer width of the outboard end in the tire circumferential direction.

2. The tire according to claim 1, wherein
the five land portions comprise ground contact surfaces having respective widths in the tire axial direction such that the nearer to the outboard tread edge the larger the width.

3. The tire according to claim 2, wherein
the four circumferential grooves comprise an outboard shoulder circumferential groove located nearest to the outboard tread edge in the four circumferential grooves,
the five land portions comprise an outboard shoulder land portion having the outboard tread edge, and an outboard middle land portion adjacent to the outboard shoulder land portion via the outboard shoulder circumferential groove,
the outboard shoulder land portion is provided with a plurality of outboard shoulder lateral grooves and a plurality of outboard shoulder sipes,
the plurality of outboard shoulder lateral grooves extends from the outboard shoulder circumferential groove to a location beyond the outboard tread edge,
the plurality of outboard shoulder sipes is in communication with the outboard shoulder circumferential groove,
the plurality of outboard shoulder sipes each comprises a pair of sipe edges each having a chamfer portion, the chamfer portion extending over an entire region of each sipe edge, in a region from the outboard shoulder circumferential groove to the outboard tread edge,
the outboard middle land portion is provided with a plurality of outboard middle groove-like portions that traverses the outboard middle land portion completely in the tire axial direction, and
distances in the tire circumferential direction between inner ends of the respective outboard shoulder sipes on an outboard shoulder circumferential groove side and outer ends of the respective outboard middle groove-like portions on the outboard shoulder circumferential groove side are equal to or less than 5% of a pitch length in the tire circumferential direction of the plurality of outboard shoulder sipes.

4. The tire according to claim 3, wherein
the plurality of outboard middle groove-like portions each comprises a pair of wall surfaces extending along a tire radial direction, and
the plurality of outboard middle groove-like portions comprises a plurality of outboard middle sipes in which a maximum distance between the pair of wall surfaces is equal to or less than 1.5 mm.

5. The tire according to claim 3, wherein
the plurality of outboard middle groove-like portions each comprises a pair of wall surfaces extending along a tire radial direction,
the plurality of outboard middle groove-like portions comprises a plurality of outboard middle lateral grooves in which a maximum distance between the pair of wall surfaces is greater than 1.5 mm, and
the plurality of outboard middle lateral grooves extends in an S-shaped manner including a curved portion convex to a first circumferential side and a curved portion convex to a second circumferential side.

6. The tire according to claim 3, wherein
the outboard middle groove-like portions each comprises at least one shallow bottom portion and at least one deep bottom portion having a depth greater than that of the at least one shallow bottom portion,
the at least one deep bottom portion comprises
a first deep bottom portion located on an outboard tread edge side with respect to a center in the tire axial direction of the outboard middle land portion, and
a second deep bottom portion located on an inboard tread edge side with respect to the center of the outboard middle land portion, and
the at least one shallow bottom portion is located between the first deep bottom portion and the second deep bottom portion.

7. The tire according to claim 3, wherein
the plurality of outboard shoulder lateral grooves each comprises a pair of groove edges each having a chamfer portion,
the plurality of outboard shoulder sipes terminates within the outboard shoulder land portion without reaching the outboard tread edge, and
the plurality of outboard shoulder sipes each comprises a deep bottom portion including an end on an outboard shoulder circumferential groove side and a shallow bottom portion having a depth smaller than that of the deep bottom portion.

8. The tire according to claim 2, wherein
the five land portions comprise a crown land portion disposed on a tire equator and an inboard middle land portion adjacent to the inboard shoulder land portion via the inboard shoulder circumferential groove,
the width in the tire axial direction of the ground contact surface of the inboard shoulder land portion is equal to or more than 90% of a width in the tire axial direction of the ground contact surface of the crown land portion,
a center in the tire axial direction of the crown land portion is located on an outboard tread edge side with respect to the tire equator,
the inboard middle land portion is provided with a plurality of inboard middle traverse-sipes that traverses the inboard middle land portion completely in the tire axial direction, and
the plurality of inboard middle traverse-sipes each comprises a pair of sipe edges each having a chamfer portion.

9. The tire according to claim 8, wherein
the inboard shoulder land portion is provided with a plurality of inboard shoulder connecting sipes extending from the respective inner ends of the plurality of inboard shoulder lateral grooves to the inboard shoulder circumferential groove.

10. The tire according to claim 2, wherein
the four circumferential grooves comprise an outboard shoulder circumferential groove located nearest to the outboard tread edge in the four circumferential grooves,
the five land portions comprise an outboard shoulder land portion having the outboard tread edge, and an outboard middle land portion adjacent to the outboard shoulder land portion via the outboard shoulder circumferential groove,
the outboard shoulder land portion is provided with a plurality of outboard shoulder lateral grooves and a plurality of outboard shoulder sipes,
the plurality of outboard shoulder lateral grooves extends from the outboard shoulder circumferential groove to a location beyond the outboard tread edge,
the plurality of outboard shoulder sipes is in communication with the outboard shoulder circumferential groove,
the plurality of outboard shoulder sipes each comprises a pair of sipe edges each having a chamfer portion, the chamfer portion extending over an entire region of each sipe edge, in a region from the outboard shoulder circumferential groove to the outboard tread edge, the outboard middle land portion is provided with a plurality of outboard middle groove-like portions that traverses the outboard middle land portion completely in the tire axial direction, distances in the tire circumferential direction between inner ends of the respective outboard shoulder sipes on an outboard shoulder circumferential groove side and outer ends of the respective outboard middle groove-like portions on the outboard shoulder circumferential groove side are equal to or less than 5% of a pitch length in the tire circumferential direction of the plurality of outboard shoulder sipes, the outboard middle groove-like portions each comprises a pair of wall surfaces extending along a tire radial direction, and the plurality of outboard middle groove-like portions comprises a plurality of outboard middle sipes in which a maximum distance between the pair of wall surfaces is equal to or less than 1.5 mm.

11. The tire according to claim 10, wherein
the outboard middle groove-like portions each comprises at least one shallow bottom portion and at least one deep bottom portion having a depth greater than that of the at least one shallow bottom portion, the at least one deep bottom portion comprises
a first deep bottom portion located on an outboard tread edge side with respect to a center in the tire axial direction of the outboard middle land portion, and
a second deep bottom portion located on an inboard tread edge side with respect to the center of the outboard middle land portion, and the at least one shallow bottom portion is located between the first deep bottom portion and the second deep bottom portion.

12. The tire according to claim 2, wherein
the four circumferential grooves comprise an outboard shoulder circumferential groove located nearest to the outboard tread edge in the four circumferential grooves, the five land portions comprise an outboard shoulder land portion having the outboard tread edge, and an outboard middle land portion adjacent to the outboard shoulder land portion via the outboard shoulder circumferential groove, the outboard shoulder land portion is provided with a plurality of outboard shoulder lateral grooves and a plurality of outboard shoulder sipes, the plurality of outboard shoulder lateral grooves extends from the outboard shoulder circumferential groove to a location beyond the outboard tread edge, the plurality of outboard shoulder sipes is in communication with the outboard shoulder circumferential groove, the plurality of outboard shoulder sipes each comprises a pair of sipe edges each having a chamfer portion, the chamfer portion extending over an entire region of each sipe edge, in a region from the outboard shoulder circumferential groove to the outboard tread edge, the outboard middle land portion is provided with a plurality of outboard middle groove-like portions that traverses the outboard middle land portion completely in the tire axial direction, vdistances in the tire circumferential direction between inner ends of the respective outboard shoulder sipes on an outboard shoulder circumferential groove side and outer ends of the respective outboard middle groove-like portions on the outboard shoulder circumferential groove side are equal to or less than 5% of a pitch length in the tire circumferential direction of the plurality of outboard shoulder sipes, and the outboard shoulder lateral grooves each comprises a pair of groove edges each having a chamfer portion.

13. The tire according to claim 1, wherein
the five land portions comprise a crown land portion disposed on a tire equator, and the width in the tire axial direction of the ground contact surface of the inboard shoulder land portion is equal to or more than 90% of a width in the tire axial direction of the ground contact surface of the crown land portion.

14. The tire according to claim 13, wherein
a center in the tire axial direction of the crown land portion is located on an outboard tread edge side with respect to the tire equator.

15. The tire according to claim 1, wherein
the five land portions comprise an inboard middle land portion adjacent to the inboard shoulder land portion via the inboard shoulder circumferential groove, the inboard middle land portion is provided with a plurality of inboard middle sipes, and the plurality of inboard middle sipes extends from the inboard shoulder circumferential groove and terminates within the inboard middle land portion.

16. The tire according to claim 1, wherein
the inboard shoulder land portion is provided with a plurality of inboard shoulder connecting sipes that extends from the respective inner ends of the plurality of inboard shoulder lateral grooves to the inboard shoulder circumferential groove.

17. A tire comprising:
a tread portion having a designated mounting direction to a vehicle, the tread portion comprising an outboard tread edge and an inboard tread edge which are respectively located outside and inside of a vehicle when being mounted to the vehicle, four circumferential grooves extending continuously in a tire circumferential direction between the outboard tread edge and the inboard tread edge, and five land portions divided by the four circumferential grooves, the four circumferential grooves comprising an inboard shoulder circumferential groove located nearest to the inboard tread edge in the four circumferential grooves, the five land portions comprising an inboard shoulder land portion disposed outward in the tire axial direction of the inboard shoulder circumferential groove, the inboard shoulder land portion having a ground contact surface with a smallest width in the tire axial direction in the five land portions, the inboard shoulder land portion being provided with a plurality of inboard shoulder lateral grooves and a plurality of inboard shoulder sipes, the plurality of inboard shoulder lateral grooves comprising inner ends that are located by a distance in the tire axial direction away from the inboard shoulder circumferential groove, the plurality of inboard shoulder lateral grooves extending outward in the tire axial direction from the inner ends to a location beyond the inboard tread edge, the plurality of inboard shoulder sipes extending from the inboard shoulder circumferential groove to a location beyond the inboard tread edge, the five land portions comprise an inboard middle land portion adjacent to the inboard shoulder land portion via the inboard shoulder circumferential groove, the inboard middle land portion is provided with a plurality of inboard middle lateral grooves that traverses the inboard middle land portion completely in the tire axial direction, distances in the tire circumferential direction between ends of the respective inboard middle lateral grooves on an inboard shoulder circumferential groove side and ends of the respective inboard shoulder sipes on the inboard shoulder circumferential groove side are equal to or less than 15% of a distance in the tire circumferential direction at the inboard tread edge from one of the plurality of inboard shoulder lateral grooves to one of the plurality of inboard shoulder sipes which are directly adjacent in the tire circumferential direction, and the inboard middle lateral grooves extend straight.

18. The tire according to claim 17, wherein the four circumferential grooves comprise an outboard shoulder circumferential groove located nearest to the outboard tread edge in the four circumferential grooves, the five land portions comprise an outboard shoulder land portion having the outboard tread edge, the outboard shoulder land portion is provided with a plurality of outboard shoulder lateral grooves and a plurality of outboard shoulder sipes, the plurality of outboard shoulder lateral grooves extends from the outboard shoulder circumferential groove to a location beyond the outboard tread edge, each of the plurality of outboard shoulder lateral grooves has a pair of groove edges each having a chamfer portion extending over an entire length of the outboard shoulder lateral groove, in a tread plan view, each chamfer portion decreases continuously in chamfer width from the outboard shoulder circumferential groove to the outboard tread edge, and the plurality of outboard shoulder sipes each comprises a pair of sipe edges each having a chamfer portion extending over an entire region of each sipe edge with a constant chamfer width.

\* \* \* \* \*